United States Patent
Anlage et al.

(10) Patent No.: US 11,101,915 B2
(45) Date of Patent: Aug. 24, 2021

(54) SYSTEM AND METHOD FOR WIRELESS POWER TRANSFER USING TIME REVERSED ELECTROMAGNETIC WAVE PROPAGATION

(71) Applicant: UNIVERSITY OF MARYLAND, COLLEGE PARK, College Park, MD (US)

(72) Inventors: Steven Mark Anlage, Laurel, MD (US); Frank Cangialosi, Ellicott City, MD (US); Tyler Grover, St. Leonard, MD (US); Andrew Simon, Gaithersburg, MD (US); Scott Roman, Reisterstown, MD (US); Liangcheng Tao, Plano, TX (US)

(73) Assignee: University of Maryland, College Park, College Park, MD (US)

( * ) Notice: Subject to any disclaimer, the term of this patent is extended or adjusted under 35 U.S.C. 154(b) by 208 days.

(21) Appl. No.: 16/096,430

(22) PCT Filed: Apr. 25, 2017

(86) PCT No.: PCT/US2017/029310
§ 371 (c)(1),
(2) Date: Oct. 25, 2018

(87) PCT Pub. No.: WO2017/189511
PCT Pub. Date: Nov. 2, 2017

(65) Prior Publication Data
US 2019/0140766 A1    May 9, 2019

Related U.S. Application Data

(60) Provisional application No. 62/327,349, filed on Apr. 25, 2016, provisional application No. 62/327,346, filed on Apr. 25, 2016.

(51) Int. Cl.
*H02J 50/20* (2016.01)
*H02J 50/90* (2016.01)
(Continued)

(52) U.S. Cl.
CPC ............... *H04K 1/06* (2013.01); *H02J 50/20* (2016.02); *H02J 50/90* (2016.02); *H04K 1/00* (2013.01);
(Continued)

(58) Field of Classification Search
CPC .. H04K 1/06; H04K 1/00; H04K 3/62; H04K 3/68; H02J 50/90; H02J 50/20; H02J 50/15; H04B 11/00
(Continued)

(56) References Cited

U.S. PATENT DOCUMENTS

| 3,314,067 A * | 4/1967 | Rutz | H01Q 3/42 |
| | | | 342/352 |
| 4,809,005 A * | 2/1989 | Counselman, III | G01C 15/00 |
| | | | 342/352 |

(Continued)

OTHER PUBLICATIONS

Nonlinear Time Reversal in a Wave Chaotic System, Matthew Frazier et al., Physical Review Letters, American Physical Society, PRL 110, 063902 (2013).
(Continued)

*Primary Examiner* — Rexford N Barnie
*Assistant Examiner* — Kalu Kelly Emeaba
(74) *Attorney, Agent, or Firm* — Rosenberg, Klein & Lee

(57) ABSTRACT

The subject method for delivering power to a moving target wirelessly via electromagnetic time reversal can find applications in wireless electrical transmission to portable devices, wireless heating of portable devices, novel wirelessly powered accelerometers, hyperthermic treatment of cancers, and many other applications. The subject non-linear
(Continued)

time reversed electromagnetic waves based wireless power transmission (WPT) system targets either a single linear or non-linear object where a selective targeting between two diodes has been demonstrated simultaneously with different degrees of non-linearity in a three-dimensional ray-chaotic billiard model. A dual-purpose rectenna with harmonic generation for wireless power transfer by non-linear time-reversal has been designed for the subject system using the Schottky diode.

15 Claims, 12 Drawing Sheets

(51) Int. Cl.
  H04K 1/06    (2006.01)
  H04K 3/00    (2006.01)
  H04K 1/00    (2006.01)
  H02J 50/23   (2016.01)
  H04B 11/00   (2006.01)

(52) U.S. Cl.
  CPC ............... H04K 3/62 (2013.01); H04K 3/68 (2013.01); *H02J 50/23* (2016.02); *H04B 11/00* (2013.01)

(58) Field of Classification Search
  USPC ........................................ 307/104
  See application file for complete search history.

(56) References Cited

U.S. PATENT DOCUMENTS

| | | | | |
|---|---|---|---|---|
| 4,860,018 A * | 8/1989 | Counselman, III | .... | G01C 15/00 342/357.48 |
| 5,412,620 A * | 5/1995 | Cafarella | ............... | H04B 11/00 340/850 |
| 5,486,833 A * | 1/1996 | Barrett | .................... | G01S 7/414 342/204 |
| 6,215,983 B1 * | 4/2001 | Dogan | ..................... | G01S 3/74 375/324 |
| 6,426,977 B1 * | 7/2002 | Lee | .......................... | H04K 1/00 375/259 |
| 7,176,828 B2 * | 2/2007 | Tirkel | .................... | G01V 8/005 342/22 |
| 7,570,063 B2 * | 8/2009 | Van Veen | ............. | A61B 5/0507 324/637 |
| 7,643,377 B1 * | 1/2010 | Uzes | ..................... | H01Q 1/246 367/135 |
| 7,777,672 B2 * | 8/2010 | Schnitzer | ................ | G01S 7/285 342/193 |
| 8,542,555 B1 * | 9/2013 | Uzes | ........................ | H01Q 1/36 367/87 |
| 9,124,125 B2 | 9/2015 | Leabman et al. | | |
| 9,182,481 B2 * | 11/2015 | Bowring | ............... | G01S 13/887 |
| 9,424,665 B1 * | 8/2016 | Frazier | ..................... | H04K 1/06 |
| 9,467,118 B2 * | 10/2016 | Zhou | .................. | G06K 7/10237 |
| 9,554,411 B1 * | 1/2017 | Hall | ........................ | H02J 50/15 |
| 9,746,552 B2 * | 8/2017 | Bowring | ................ | G01S 7/417 |
| 2004/0086118 A1 * | 5/2004 | Sweetser | .................. | H04K 1/00 380/54 |
| 2004/0240588 A1 * | 12/2004 | Miller | ..................... | H04L 25/14 375/340 |
| 2007/0071077 A1 * | 3/2007 | Yang | ..................... | H04B 11/00 375/218 |
| 2009/0201763 A1 * | 8/2009 | Jones | .................... | G01S 15/003 367/5 |
| 2009/0284083 A1 * | 11/2009 | Karalis | .................. | H01Q 1/248 307/104 |
| 2013/0033118 A1 * | 2/2013 | Karalis | ................... | H02J 50/12 307/104 |
| 2013/0136061 A1 * | 5/2013 | Trachewsky | ............ | H04K 1/00 370/328 |
| 2013/0285477 A1 | 10/2013 | Lo et al. | | |
| 2013/0293025 A1 | 11/2013 | Xu et al. | | |
| 2017/0077765 A1 * | 3/2017 | Bell | ........................ | G01S 15/88 |
| 2017/0110887 A1 * | 4/2017 | Bell | ..................... | H04B 5/0037 |
| 2017/0133881 A1 * | 5/2017 | Cho | ...................... | H02J 7/0042 |
| 2017/0149522 A1 * | 5/2017 | Passerieux | ............ | H04B 11/00 |
| 2017/0179771 A1 * | 6/2017 | Leabman | ................ | H02J 5/005 |
| 2017/0302097 A1 * | 10/2017 | Kim | ..................... | H02J 7/00047 |
| 2017/0302109 A1 * | 10/2017 | Lee | ........................ | H02J 7/025 |
| 2017/0324280 A1 * | 11/2017 | Suzuki | ................... | H02J 50/12 |
| 2018/0026481 A1 * | 1/2018 | Ku | ....................... | H04B 5/0037 370/329 |
| 2019/0140766 A1 * | 5/2019 | Anlage | ................... | H04K 1/06 |

OTHER PUBLICATIONS

Time Reversed Electromagnetics as a Novel Method for Wireless Power Transfer, Anu Challa et al., Bulletin of the American Physical Society, vol. 61, No. 2, Session V43: Wave Chaos: Theory and Applications.

W.C. Brown. "The History of Power Transmission by Radio Waves." IEEE Trans. Microwave Theory and Techniques, vol. 32, No. 9 (Sep. 1984), pp. 1230-1242. DOI: 10.1109/TMTT.1984.1132833.

A. Derode, et al. "Time Reversal Versus Phase Conjugation in a Multiple Scattering Environment." Ultrasonics, vol. 40, No. 1 (May 2002), pp. 275-280. DOI: 10.1016/S0041-624X(02)00106-3.

M. Frazier, et al. "Nonlinear Time Reversal of Classical Waves: Experiment and Model." Phys. Rev. E, vol. 88, No. 6 (Dec. 2013), p. 062910. DOI: 10.1103/PhysRevE.88.062910.

S. Hemmady, et al. "Universal Properties of 2-Port Scattering, Impedance and Admittance Matrices of Wave Chaotic Systems." Phys. Rev. E, vol. 74, No. 3 (Jul. 2006), p. 036213. DOI: 10.1103/PhysRevE.74.036213.

S. Hemmady, et al. "Statistical Prediction and Measurement of Induced Voltages on Components Within Complicated Enclosures: A Wave-Chaotic Approach." IEEE Trans. Electromagnetic Compatibility, vol. 54, No. 4 (Jan. 2012), pp. 758-771. DOI: 10.1109/TEMC.2011.2177270.

S.Y.R. Hui, et al. "A Critical Review of Recent Progress in Mid-Range Wireless Power Transfer" IEEE Trans. Power Electronics, vol. 29, No. 9 (Sep. 2014), pp. 4500-4511. DOI: 10.1109/TPEL.2013.2249670.

J. Jadidan, et al. "Magnetic Mimo: How to Charge Your Phone in Your Pocket." Proc. 20th Ann. Intl. Conf. Mobile Computing and Networking (Sep. 2014), pp. 495-506. DOI: 10.1145/2639108.2639130.

G. Lerosey, et al. "Focusing Beyond the Diffraction Limit with Far-Field Time Reversal." Science, vol. 315, No. 5815 (Mar. 2007), pp. 1120-1122. DOI: 10.1126/science.1134824.

G. Lerosey, et al. "Time Reversal of Electromagnetic Waves." Phys. Rev. Letters, vol. 92, No. 19 (May 2004), p. 193904. DOI: 10.1103/PhysRevLett.92.193904.

C. Prada, et al. "The Iterative Time Reversal Mirror: A Solution to Self-Focusing in the Pulse Echo Mode." J. Acoust. Soc. Am., vol. 90, No. 2 (Aug. 1991), pp. 1119-1129. DOI: 10.1121/1.402301.

* cited by examiner

SYSTEM AND METHOD FOR WIRELESS POWER TRANSFER USING TIME REVERSED ELECTROMAGNETIC WAVE PROPAGATION

REFERENCE TO THE RELATED APPLICATIONS

This Utility Patent Application is 371 national phase of PCT Patent Application PCT/US2017/029310 which is based on Provisional Patent Applications Nos. 62/327,346 and 62/327,349, both filed on 25 Apr. 2016.

STATEMENT REGARDING FEDERAL SPONSORED RESEARCH OR DEVELOPMENT

This invention was made with Government support under Contract N000141512134 awarded by ONR and Contract FA9550-15-1-0171 awarded by AFOSR. The Government has certain rights in the invention.

FIELD OF THE INVENTION

The present invention is directed to the field of wireless power transfer in ray-chaotic environments, and more in particular, to wireless power transfer using time reversal technique.

The present invention is further directed to time reversed electromagnetic wave propagation to transmit energy to a moving target in a reverberant complex scattering environment.

The present invention is also directed to a system and method for wireless transmission of power to multiple receiving devices at the same time with selection of users to receive power to the exclusion of others based on selective collapse of non-linear time reversed electromagnetic waves.

In addition, the present invention is directed to the structure of a dual-purpose rectenna (rectifier/antenna) capable of non-linear harmonic generation for wireless power transfer using non-linear time-reversal principles.

Furthermore, the present invention is directed to the wireless power transfer system and method employing non-linear time-reversal technique and uses a Schottky diode at the receiving antenna to create a dual-purpose rectenna capable of non-linear harmonic generation and signal rectification.

BACKGROUND OF THE INVENTION

Many techniques have been proposed for wireless power transfer (WPT) ranging from magnetic resonance to microwave beaming. While the ability to transmit power practically and efficiently at short to mid-range is well-demonstrated in the literature, there is relatively little prior work that retains both high efficiency and practicality at distances beyond a few meters (S. Hui, et al., "A Critical Review of Recent Progress in Mid-Range Wireless Power Transfer," *Power Electronics, IEEE Transactions On,*" vol. 29, no. 9, pp. 4500-4511, September 2014).

Traditional methods of long-range WPT have relied on microwave beaming (W. C. Brown, "The History of Power Transmission by Radio Waves," *Microwave Theory and Techniques, IEEE Transactions On,*" vol. 32, no. 9, pp. 1230-1242, September 1984). While efficient, this technique requires precise alignment of transmitter and receiver, and further requires a clear line of sight propagation path. Even in those cases where line of sight may be achievable, it is highly impractical due to the danger it introduces to humans or wildlife that may cross its path. Finding a way to transmit microwave power over long distances in a less concentrated transmission channel would be highly desirable.

Magnetic resonance beacons have been used to extend magnetic resonance coupling to longer distances. While safer than microwave beaming, these beacons still have a relatively limited range (S. Hui, et al., "A Critical Review of Recent Progress in Mid-Range Wireless Power Transfer," *Power Electronics, IEEE Transactions On,*" vol. 29, no. 9, pp. 4500-4511, September 2014).

There is also an interest in MIMO (Multiple Input Multiple Output) charging devices that allow for combined data and energy transfer using microwaves. The proposed Cota system, for example, is able to wirelessly transmit power via a form of magnetic-beamforming.

Other methods, such as the Energous' WattUp, apply phase conjugation to the microwave signal (M. A. Leabman, et al., "Wireless Power Transmission with Selective Range," Sep. 1, 2015, U.S. Pat. No. #9,124,125). This method suffers from bandwidth limitations in general (C. Prada, et al., "The Iterative Time Reversal Mirror: A Solution to Self-Focusing in the Pulse Echo Mode," *The Journal of the Acoustical Society of America*, vol. 90, no. 2, pp. 1119-1129, 1991; A. Derode, et al., "Time Reversal versus Phase Conjugation in a Multiple Scattering Environment," *Ultrasonics*, vol. 40, no. 1, pp. 275-280, 2002). The efficiency and reliability of these techniques has yet to be explored.

There exists extensive prior work directed to electromagnetic time reversal (G. Lerosey, et al., "Time Reversal of Electromagnetic Waves," *Physical Review Letters*, vol. 92, no. 19, p. 193904, 2004; M. Frazier, et al., "Nonlinear Time Reversal in a Wave Chaotic System," *Physical Review Letters*, vol. 110, no. 6, p. 063902, 2013); M. Frazier, et al., "Nonlinear Time Reversal of Classical Waves: Experiment and Model," *Physical Review E*, vol. 88, no. 6, p. 062910, 2013). For the technique to be viable, reconstructions must converge on a small point, without interfering with nearby electronics or biological matter. The existing techniques remain largely unexplored in the context of WPT.

The ability to focus waves at a specific point in space and time is desirable for many applications. Time-reversal (TR) is one such process that allows for this type of spatial and temporal focusing. Acoustic TR, for instance, has been used to destroy kidney stones by focusing ultrasonic waves on such kidney stones without harming the individual, greatly reducing the discomfort of performing lithotripsy. Time-reversal of sound waves has also been used to locate cracks in walls, providing information about the failure modes of these structures.

With electromagnetic waves, TR has been used to securely transfer information between two sources through an exclusive data link that eavesdroppers may not access. Similarly, TR may be used to transfer power to different devices within a chamber without sending power to the entire chamber, creating a unique, wireless, transmission channel.

It is therefore desirable to provide the time reversal technique as an alternative to the prior wireless power transfer techniques which would be well-suited for ray-chaotic environments which are quite commonly found in settings where WPT technology is desired, and where the ability of time reversal to focus energy to a point in space is needed.

It would also be desirable to provide a WPT processing system based on time-reversed propagation of electromagnetic waves in a complex scattering environment capable of targeting of either a linear or non-linear object, and where the non-linear object is considered both as a beacon for TR and as a mechanism for rectifying the EM signal for use in power applications.

It is also desirable to provide a system and method for wireless power transfer by non-linear time reversal technique where the harmonics generation and rectification capability of the Schottky diode are exploited to create a dual-purpose rectenna/rectifier/antenna for wireless power transfer.

SUMMARY OF THE INVENTION

It is therefore an object of the present invention to provide a novel method of wireless power transfer using time reversed electromagnetic wave propagation (which is a signal focusing method that exploits the time reversal invariance of the lossless wave equation to direct signals on a single point inside the complex scattering environment) to characterize the behavior of the time-reversed signal as it is applied to a moving target and to transmit energy to the moving target in a reverberant environment.

It is another object of the present invention to explore the properties of time-reversed microwave pulses in a low-loss ray-chaotic environment, and to measure the spatial profile of the collapsing wave front around the target antenna, as well as to demonstrate that the time reversal can be used to locate a receiver in motion, and to transfer energy thereto.

It is another object of the present invention to provide a WPT process based on time-reversed propagation of electromagnetic waves in a complex scattering environment for targeting of either a single linear or a non-linear object.

It is still an object of the present invention to provide s selective collapse technique for non-linear time reversed electromagnetic waves where selective targeting between two diodes have been demonstrated simultaneously with different degrees of non-linearity in a two-dimensional ray-chaotic billiard model.

It is another object of the present invention to provide a wireless power transfer system and method using non-linear time reversed electromagnetic wave propagation where both a linear sona purely from the broadcast location and a non-linear sona from the object of interest are collected, and where the Non-Linear Time-Reverse (NLTR) works without any knowledge of the exact location of the non-linear object, as the non-linear sona is uniquely created based on the object's location in a cavity. By filtering out either the linear or non-linear frequencies from the overall recorded sona, it has been shown that selective targeting of either the linear port (i.e., the initial emitter of the interrogation pulse), or the non-linear port (the non-linear object) may be realized.

It is a further object of the present invention to provide a wireless power transfer system and method, where by filtering out either the linear or non-linear frequencies from the overall recorded sona, the selective targeting of either the linear port (i.e., the initial emitter of the interrogation pulse), or the non-linear port (the non-linear object) may be realized by using the pulse-inversion method of filtering to efficiently isolate the non-linear signal.

It is still another object of the present invention to provide a wireless power transfer system and method which extracts the non-linear sona by summing the sonas from interrogation and inverted into interrogation pulses sent into the cavity, and where due to the non-linear nature of the response, the linear portion and odd-harmonics (1f, 3f, 5f, etc.), where f is the carrier frequency of the initial pulse, are cancelled, and the even-harmonic non-linear portion (2f, 4f, 6f, etc.) are doubled in amplitude.

It is still an object of the present invention to provide the dual-purpose rectenna (rectification/antenna) with harmonic generation capabilities for wireless power transfer by a non-linear time-reversal based on harmonic generation and rectification capabilities of the Schottky diode to create a dual-purpose rectenna for wireless power transfer by the method of non-linear time reversal.

In addition, it is an object of the present invention to provide a non-linear time reversal based wireless power transfer using a high frequency, low impedance Schottky diode selected as the rectifier and non-linear element for the receiving antenna. The Schottky diode is mounted on a half-wave dipole printed circuit board designed for operation at 5.45 GHz, where a capacitor is mounted between the Schottky diode and the load for filtering out high frequency signals.

In one aspect, the present invention constitutes a method for selective collapse of non-linear time reversed electromagnetic waves specifically on a target of interest (with exclusion of the other targets), which includes the following steps:

positioning a transmitting antenna (port A) and a receiving antenna (port B) in a reverberant complex scattering environment;

positioning at least one passive non-linear object characterized by a predetermined voltage $V_k$ in the reverberant complex scattering environment; and broadcasting an initial pulse of a predetermined amplitude at a first frequency from the transmitting antenna (port A).

The initial pulse causes a non-linear response signal generated by the passive non-linear object at a second frequency when excited above the predetermined voltage $V_k$ of the non-linear object. The voltage $V_k$ can be varied to control the non-linear response.

The subject method continues by:
recording a resulting signal at the receiving antenna (port B), where the resulting signal is composed of a signal corresponding to the initial pulse sent from the transmitting antenna (port A) and the non-linear response signal from the non-linear object;

extracting the non-linear response signal from the resulting signal using pulse-inversion filtering applied to the resulting signal;

time-reversing the extracted non-linear response signal; and re-emitting the time-reversed non-linear response signal from the receiving antenna (port B) into the reverberating complex scattering environment to create a reconstruction non-linear signal at the location of the passive non-linear object, thus targeting the passive non-linear object and delivery of power thereto. The reconstruction non-linear signal constitutes the power delivered to the non-linear object.

The subject method further includes the steps of:
positioning at least two passive non-linear objects in the reverberant complex scattering environment, where the two passive non-linear objects have different voltages $V_k$ which determine the strength of the non-linear response of a respective passive non-linear object.

The initial pulse is broadcast from the transmitting antenna (port A) at different amplitudes to control the strength of the non-linear response and to target a corresponding one of the at least two passive non-linear passive objects.

The resulting signal recorded at the receiving antenna (port B) is rectified by using a Schottky diode coupled to the receiving antenna.

In another aspect, the present invention constitutes a method for delivering power to a moving target wirelessly via electromagnetic time reversal based on models which relate to system processing and transmission parameters to the effectiveness of transmission. The method for wireless power transfer to a moving target using time reversed electromagnetic wave propagation comprises the steps of:

placing a transmitting antenna and a receiving antenna in a reverberant complex scattering environment;

broadcasting an initial signal from the transmitting antenna, where the initial signal travels along multiple transmission channels within the reverberant complex scattering environment and converges at the receiving antenna, thus forming a resulting sona there. The resulting sona is formed as the sum of the reflections of the initial pulse along the numerous transmission channels. To form the resulting sona, the reflections of the initial pulse are further scaled in magnitude due to pulse-divergence and power loss, and shifted due to differing length of the transmission channels.

The subject method continues by:

translating the receiving antenna through a predetermined range of motion;

sampling the resulting sona at the receiving antenna at each location of the receiving antenna during the translation thereof;

time-receiving the sampled resulting sona;

injecting the time-reversed resulting sona into the transmitting antenna for subsequent re-broadcasting in the reverberant complex scattering environment; and receiving, at the current location of the receiving antenna, a reconstruction of the initial signal which is representative of the power transmitted to the moving target.

The reconstruction signals are sampled at the receiving antenna to acquire maximum peak signal, and maximum peak-to-peak power of the reconstruction signals sampled at a central point of the predetermined range of motion and at a respective position of the moving receiving antenna, respectively, is recorded. Subsequently, the maximum peak-to-peak power V(x) from a respective sampled reconstruction signal is determined as a function of the distance x between the reconstruction central point and the respective position of said receiving antenna as:

$$V(x) = a \cdot sinc\left(\frac{x+c}{b}\right) + d$$

where:

a is the maximum peak-to-peak amplitude, b is the wavelength of the sampled reconstruction signal divided by $2\pi$, c is the location of the receiving antenna along the predetermined range of motion, and d is the noise-level offset voltage.

In an additional aspect, the present invention is directed to a system for wireless power transfer (WPT) using a non-linear time reversal technique and employing a dual-purpose rectenna with harmonic generation and rectification using the Schottky diode. The subject system operates in a three-dimensional reverberant complex scattering environment, and includes a transmitting antenna (port A) and a receiving antenna (port B) positioned in the reverberant complex scattering environment.

The subject system is capable of operating at least in two modes of operation, including:

(a) WPT exclusively to an intended target of interest (passive non-linear object), and (b) WPT to a moving target.

For operating in delivering power exclusively to a target of interest mode of operation, the system includes at least one passive non-linear object positioned in the reverberant complex scattering environment for the power delivery exclusively to it.

The subject system operates under control of a processing system which controls generation of signals, processing of signals, broadcasting and re-broadcasting of signals, as well as time-reversing computations and pulse inverting filtering of signals migrating in the subject system.

Under control of the processing system, an initial pulse of a predetermined amplitude signal at a predetermined frequency is generated and broadcast from the transmitting antenna (port A).

The initial pulse causes generation of a non-linear response signal by the passive non-linear object at a second frequency. The generated non-linear response signal depends on a voltage $V_k$ (which is a predetermined characteristic of the passive non-linear object), and is generated when the passive non-linear object is excited above the voltage $V_k$. This process facilitates in determining the location of the passive non-linear object.

A resulting signal is created which is composed of a signal corresponding to the initial pulse sent from the transmitting antenna and the non-linear response signal emitted from the passive non-linear object. The processing system records the resulting signal at the receiving antenna.

The processing system further extracts the non-linear response signal from the resulting signal using pulse-inversion filtering, and time-reverses the extracted non-linear response signal.

The processing system further injects the time-reversed non-linear response signal into the receiving antenna for re-broadcasting the time-reversed non-linear response signal into the reverberating complex scattering environment, to create a reconstruction non-linear signal (corresponding to a power to be delivered to the passive non-linear object) at a passive non-linear object, thus targeting the non-linear object and delivery of power exclusively thereto.

The subject system may include numerous (for example, at least two) passive non-linear objects in the ray-chaotic environment, at least one of which is targeted for power delivery in exception of others. For at least two non-linear passive objects in the reverberant complex scattering environment, these non-linear passive objects have different voltages $V_k$, where the $V_k$ determines the strength of the non-linear response of each passive non-linear object.

The processing system may control (vary) the voltage $V_k$ to control the non-linear response of each non-linear object.

The processing system also controls broadcasting of the initial pulse from the transmitting antenna at different amplitudes to control the strength of the non-linear response and to target a corresponding one of the at least two non-linear passive objects.

The present system is designed with capability of rectifying the recorded resulting signal at the receiving antenna. This is accomplished by coupling a Schottky diode to the receiving antenna which results in a dual-purpose antenna with rectification and non-linear harmonic generation.

These and other objects and advantages of the present system and method will be further clarified when taken in conjunction with accompanying Patent Drawings.

BRIEF DESCRIPTION OF THE DRAWINGS

FIG. 6B shows a quasi-two-dimensional (2D) irregular cavity with various circular and elliptical segments removed from the walls, where two Teflon-coated dipole antennas are used to emit and record signals (port A and port B, respectively), and two diodes are placed inside the cavity ($V_k^{high}$ and $V_k^{low}$, respectively), FIG. 6C shows an interrogation pulse used in simulation, and FIG. 6D is a diagram representative of modes excited by the incident pulse compared to the number of modes excited in a three-dimensional room;

DETAILED DESCRIPTION OF THE PRESENT INVENTION

Figure 1:
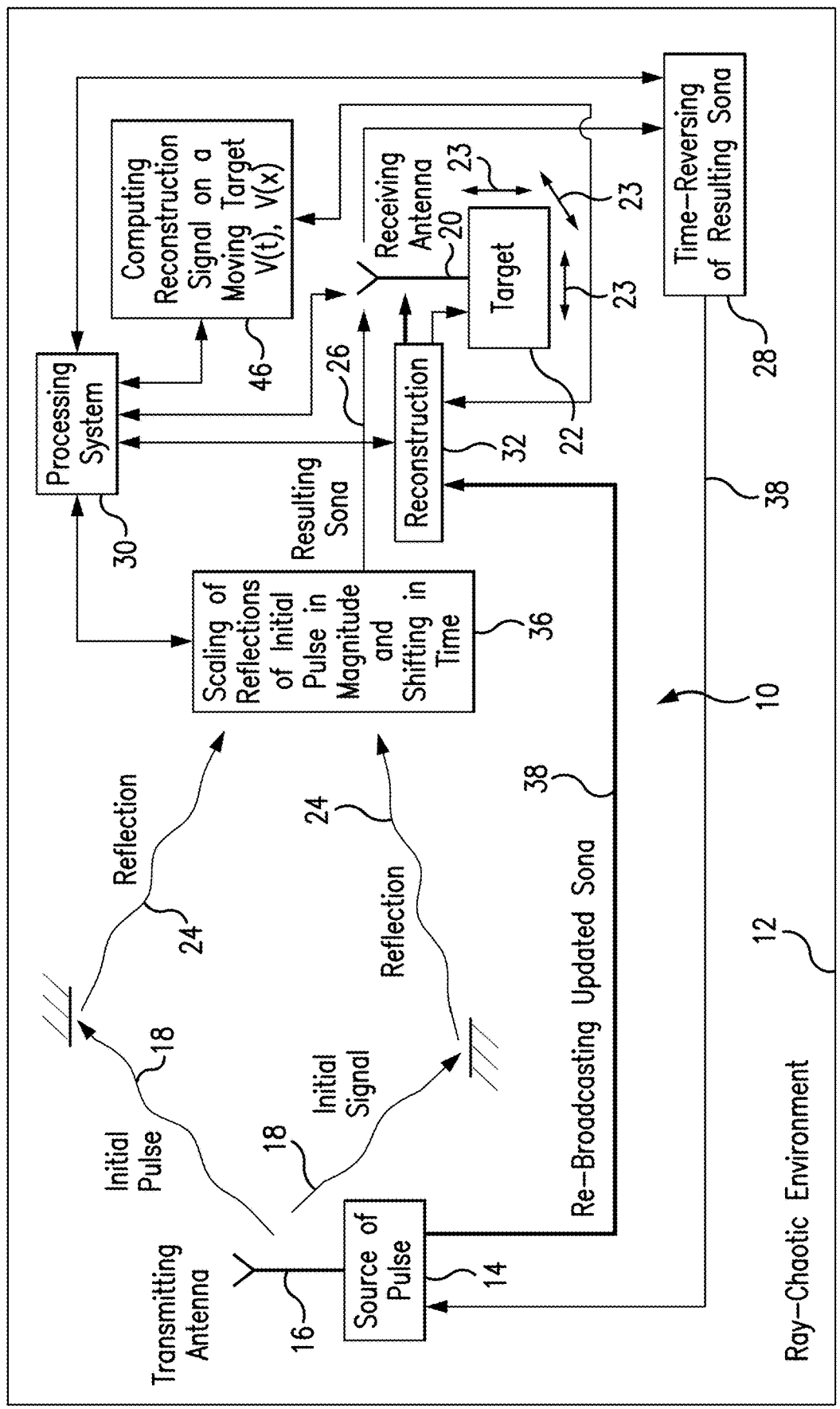
FIG. 1 is a schematic representation of the subject system in the embodiment adapted for delivering power to a moving target.

The present system uses electromagnetic waves time-reversed technique for wireless power transmission. The subject system presented in FIGS. 1, 6A, 11A, and 13A, operates in several modes of operation, including:

(a) mode of operation for delivering power to a moving target wirelessly via electromagnetic (EM) waves focusing time reversal technique, as shown in FIGS. 1-5; and (b) mode of operation for selective power delivery to a target of interest using non-linear time-reversed EM waves, as depicted in FIGS. 6A-13.

The present invention is a method and system designed to transmit power to a moving target of interest using the wave focusing time reversal technique.

Performing linear TR in an enclosure requires four steps:

(1) Broadcast an initial interrogation pulse into the enclosure at location A;

(2) As the pulse reverberates in the cavity, record a response signal, also called a sona, at another location B;

(3) Flip the recorded sona waveform in time; and (4) Broadcast the time-reversed sona at location B, creating a reconstruction of the initial signal back at location A.

The temporal symmetry of the wave equation implies that the time-reversed sona in the last step (4) will result in the time-reversed initial waveform reconstructing at the location A (but nowhere else in the enclosure). In this sense, energy is only transferred to the location of interest (Location A) and nowhere else. By rapidly repeating the TR process, a wireless transmission channel can be created to transfer power between two specific locations in an enclosure. Due to the fact that TR relies on the coherent superposition of many low-intensity channels to deliver large amounts of power to a specific location, it is an inherently safe process compared to other methods of WPT, such as microwave beaming or high power induction, that generate large E-fields locally.

The nonlinear time-reversal (NLTR) process is similar to linear TR except that is utilizes a passive nonlinear object, i.e., a device that outputs a signal at a different frequency than the input signal when it is interrogated, to establish a pair of locations that exchange power.

Nonlinear time reversal (NLTR) is being explored as a viable method of wireless power transfer (WPT). This process involves the power transfer via electromagnetic wave propagation in a ray-chaotic environment. Using this method, it is possible to both simultaneously and selectively charge devices in the environment, as well as charge devices in motion.

However, to enable NLTR for WPT, the receiver of transferred power must be capable of passive harmonic generation and rectification. The dual-purpose rectenna addresses both these requirements by taking advantage of the nonlinearity and rectification capabilities of the Schottky diode.

One of the main components of any WPT system is its rectifier, as it performs the crucial step of capturing the broadcast energy and transforming it into a usable form. To accomplish this, a rectenna, a device that combines an antenna and a rectifier, is necessary. The antenna picks up the oscillating AC signal received from the transmitter, the rectifier converts the signal to relatively stable DC power, and this usable power is passed to an arbitrary load. This is the primary function of the rectenna.

In nonlinear time reversal, a nonlinear element is required to produce harmonics from the initial interrogation pulse broadcast by the transmitter. Thus, in addition to standard rectification, for the WPT based on non-linear time reversal, the rectenna must serve a secondary function, such as to perform as a passive nonlinear element.

As shown in FIGS. 1-5, in the embodiment for power delivery to a moving target, where a reconstruction signal peak is computed as a function of the target motion, the subject system 10 operates in a ray-chaotic (also referred to herein as a reverberant complex scattering) environment 12.

A source of pulse 14 with a transmitting antenna 16 is positioned in the ray-chaotic environment 12 to generate (at the source of pulse 14) an initial pulse (or initial signal) 18 to be transmitted via the ray-chaotic environment 12 to a receiving antenna 20 coupled to a target 22 to which the power is transmitted.

Applications of the subject system 10 may include, but not limited to:
Wireless electrical transmission to portable devices,
Wireless heating of portable devices,
Novel wireless accelerometers,
Hyperthermic treatments of cancers, etc.

Due to the ray-chaotic nature of the environment 12, the initial pulse 18 which is broadcast from the transmitting antenna 16, travels through numerous transmission channels and undergoes multiple reflections resulting in numerous reflection signals 24 which travel towards the receiving antenna 20, and form thereat a resulting "sona" 26.

The resulting sona 26 represents a relationship between the transmitting antenna 16 and receiving antenna 20. The resulting sona 26 is subsequently time reversed in the sona time-reversing sub-system 28 to direct energy to the receiving antenna 20, as will be detailed in further paragraphs.

The subject system 10 constitutes a technique for treating moving target antennas. Models are developed which relate system processing and transmission parameters to the effectiveness of transmission, which are necessary for designing future time reversal wireless power systems.

As specifically shown in FIG. 1, a processing system 30 cooperates with various sub-systems of the subject system to compute location of the moving target 22 which is capable of motion along various directions 23, and to focus energy on the location of the moving target.

In the subject system 10, direct time reversal is proposed as an underlying principle to achieve the power focusing on the moving target 22.

The subject method and system 10 is especially well suited to ray-chaotic environments, which are quite commonly found in settings where WPT technology is desired. The pulse source 14 sends weak signals through many different trajectories (transmission channels) in the complex scattering environment 12, spread out over an extended time period. The reflection signals 24 are generated. All of these reflection signals 24 converge on to the location of the target 22 where they superimpose coherently at one instant to deliver a large burst of power, i.e., the resulting sona 26. As a result, energy is concentrated only at the current location of the moving target.

The present system and method use the ability of time reversal to focus energy on a point in space, forming a signal reconstruction 32 (detailed in further paragraphs). The size of the reconstruction region 32 on the target 22 is quantified, and a fit to the spatial distribution of energy is introduced as a function of carrier signal wavelength. Time reversed energy collapse is demonstrated on a moving target, and a model is similarly generated describing the energy delivered to the moving target. These models are defined in terms of the parameters of the system 10 and the theoretical bounds are discussed.

Experimental Setup

Figure 2A:
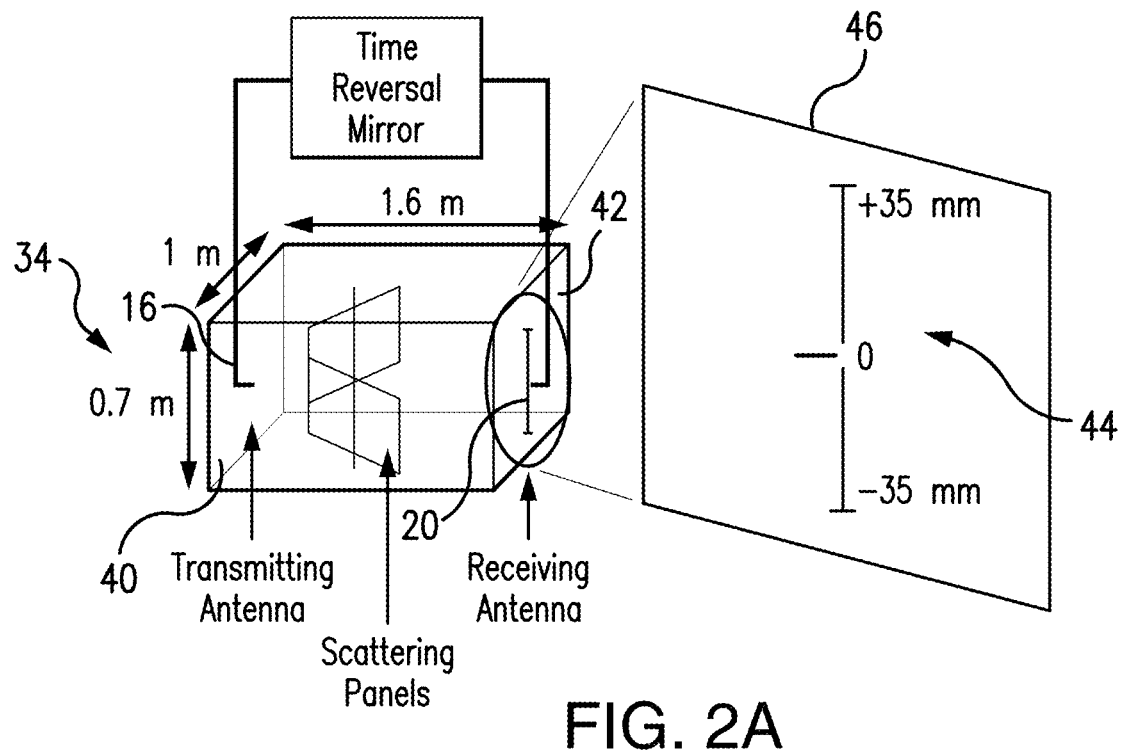
FIG. 2A is a schematic representation of a ray-chaotic enclosure with two antennas, one of which is attached to a sliding panel that can move freely along the Y axis.

Referring to FIGS. 1 and 2A-2C, the applicability of time reversal (TR) to wireless power transfer (WPT) within an enclosed reflective cavity has been studied. As shown in FIG. 2A, a 1.06 m$^3$ aluminum box 34 has been built with a conductive scattering paddle to make the ray trajectories more ergodic. Ray chaos ensures that a propagating pulse will eventually reach every point in the environment, which insures that many transmission channels are simultaneously excited, and this improves reconstruction fidelity.

Two monopole antennas (transmitting antenna 16 and receiving antenna 20) inject and extract electromagnetic signals from different points in the enclosure 34. The transmitting antenna 16 is attached to the cavity wall 40 opposite the receiving antenna 20. The receiving antenna 20 is attached to a panel 42 that can move vertically with a total range of 70 millimeters. Motion of the receiving antenna 20 is achieved using an externally-mounted PI MikroMove M-415.DG translation stage. The enclosure 34 remains sealed during the translation.

Referring to FIGS. 1 and 2A-2C, interrogation pulses (initial pulses) 18 and time-reversed sona signals 38 were created and broadcast using a Tektronix AWG7052 arbitrary waveform generator feeding an Agilent E8267D Vector PSG microwave source. A digital storage oscilloscope (DSO, Agilent DS091304A) was used to record waveforms of interest. MATLAB was used for signal processing and instrument control and coordination.

Figure 2B:
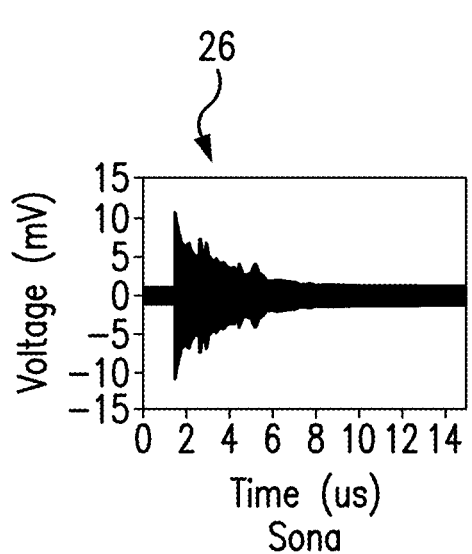
FIG. 2B is a diagram representative of a time-reversed sona which is broadcast from the transmitting antenna.
Figure 2C:
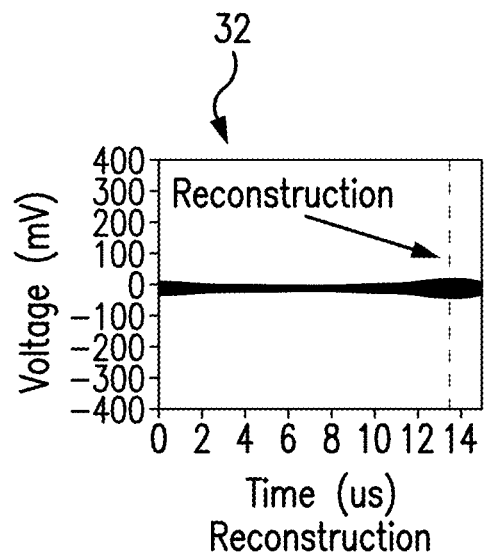
FIG. 2C is a diagram representative of a resulting reconstruction signal delivered at the moving target.

The basic time reversal process in this environment proceeds as follows:

(1) A 50 ns Gaussian pulse (with a carrier frequency of 5 GHz) is injected into the cavity of the box 34 through the transmitting antenna 16. A complex signal (referred to as a "resulting sona") 26, shown in FIG. 2B, is measured at the receiving antenna 20. The resulting sona 26 is the sum of the reflections 24 of the initial pulse 18, which is scaled in magnitude due to ray-divergence and loss, and shifted in time due to differing lengths of reflection paths by computations in the sub-system 36 under control of the processing system 30.

(2) In the next step, the resulting sona 26 is time reversed (TR) in the time-reversing sub-system 28 to form the TR sona 28 and is injected into the transmitting antenna 16. The updated sona 38 is subsequently re-broadcast from the transmitting antenna 16.

(3) The result of the re-broadcasting of the time-reversed sona 38 is a reconstruction 32 (shown in FIG. 2C) of the initial pulse 18 focused at the receiving antenna 20. The reconstruction 32 constitutes the power delivered to the moving target 22. This process makes use of a robust symmetry, namely, the spatial reciprocity of the wave equation.

Spatial Profiling

One experiment conducted measures the spatial profile of a reconstruction, with the goal of characterizing reconstruction size as a function of carrier signal wavelength. A reconstruction 32 is focused on the receiving antenna 20, in the middle of its movement range 44 (shown in FIG. 2A).

Without changing the time reversed sona being broadcast, the receiving antenna 20 was systematically translated through its entire range of movement 44.

Figure 3A:
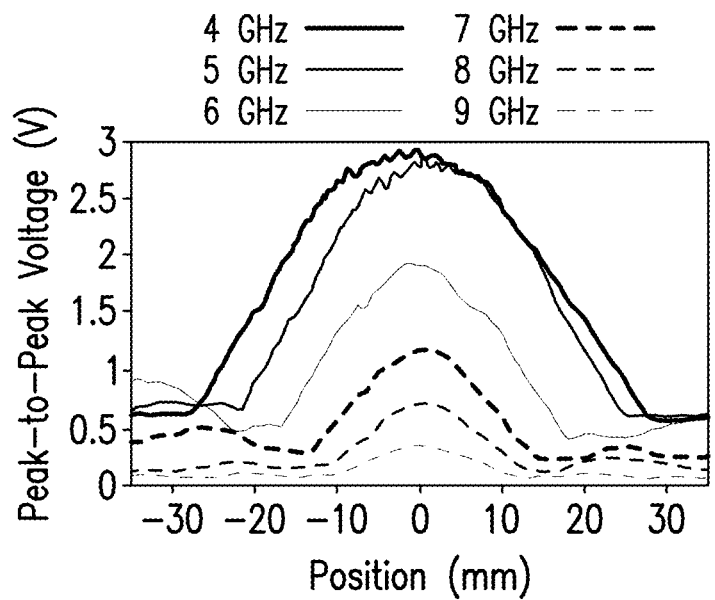
FIG. 3A is a diagram representative of a spatial profile of peak-to-peak voltage amplitudes of reconstruction signals at carrier frequencies ranging from 4 to 9 GHz in 1 GHz steps.
Figure 3B:
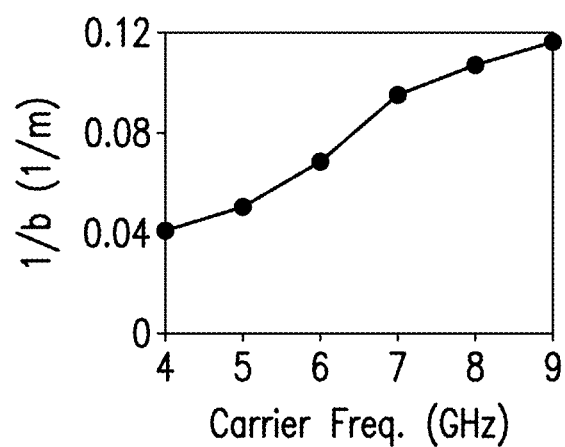
FIG. 3B shows the linear relationship between the inverse of the fit b values vs. carrier frequency.

Samples were taken at the receiving antenna 20 every 0.2 mm across the entire 70 mm range, and the maximum peak-to-peak voltage of the corresponding reconstructions 32 was recorded at each step. This experiment was repeated for carrier frequencies in the range 4-9 GHz. FIGS. 3A-3B pinpoint the results of this experiment.

The reconstruction peak-to-peak voltage profile is expected to take the form of a sinc(x) function about the receiving antenna (G. Lerosey, et al., "Focusing Beyond the Diffraction Limit with Far-Field Time Reversal," *Science*, vol. 315, no. 5815, pp. 1120-1122, 2007).

The following equation is computed in computing sub-system 46 (shown in FIG. 1) to predict the maximum peak-to-peak voltage V(x) from a given reconstruction, as a function of the distance between the reconstruction focal point and the receiver x:

$$V(x) = a \cdot sinc\left(\frac{x+c}{b}\right) + d, \quad \text{Eq. (1)}$$

where a is the maximum peak-to-peak reconstruction amplitude, b is the wavelength of the signal divided by $2\pi$, c is the location of the antenna along the x-axis, and d is the noise-level offset voltage.

Since b is proportional to the wavelength (and inversely proportional to the frequency), as the carrier frequency is increased, $$\frac{1}{b}$$

also increases, causing the "bubble" of the sinc (x) function shown in FIG. 3A to decrease. This relationship is shown explicitly in FIG. 3B.

Figure 4:
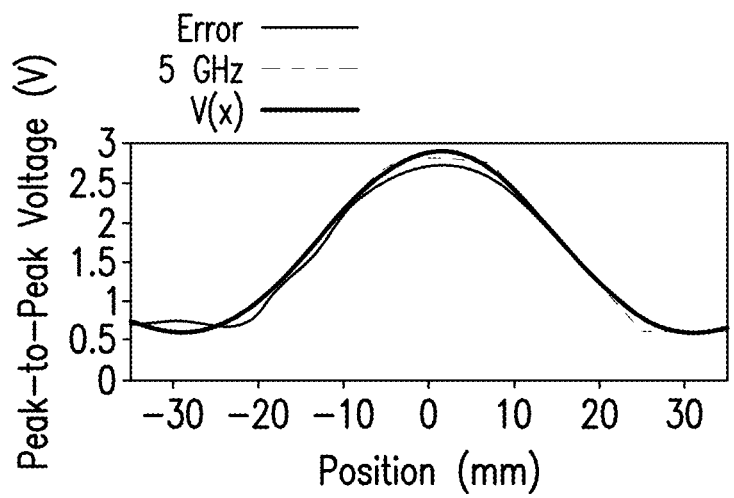
FIG. 4 is a diagram representative of the measured peak-to-peak voltage amplitude of reconstructions received in the vicinity of a time-reversed wave collapse location with a 5 GHz carrier frequency, and fit to the sinc(x) function.

FIG. 4 illustrates 1 fit to the 5 GHz curve from FIG. 3A-3B, including error bars. The fit is satisfactory, but has a reduced $x^2$ of 234 due in part to the rather large background noise level. The error bars are primarily systematic, introduced by the oscilloscope internal voltage multiplier used in scaling.

Moving Reconstructions

The time reversal process assumes that the environment 12 remains the same between the time-forward and time-reversed steps. It also assumes that the source and target remain fixed between these two steps. Time reversal was performed on the moving target 22 to better understand how a translating target affects reconstruction strength.

For this experiment, the receiving antenna 20 was moved at a constant speed of 0.5 mm/s across the entire 70 mm range provided by the MikroMove. To counteract the degradation of the reconstruction strength as the antenna 20 moved, the interrogation step was periodically repeated, effectively re-centering the reconstruction on the receiving antenna 20.

Figure 5:
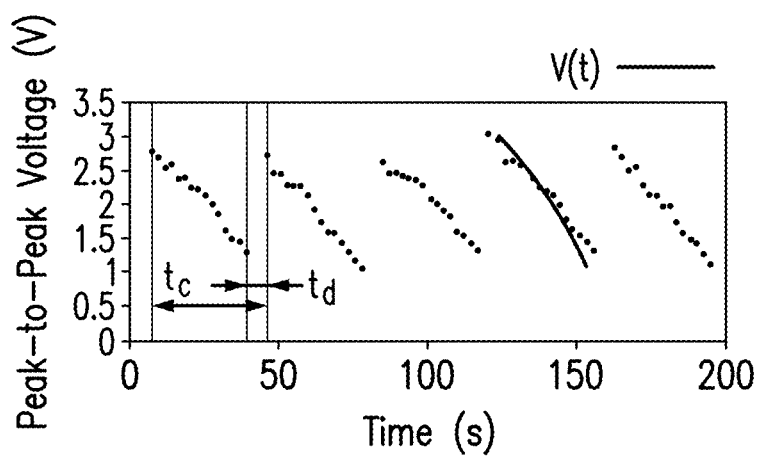
FIG. 5 is a diagram representative of a reconstruction voltage amplitude vs. time as the target antenna moves along one wall of the enclosure shown in FIG. 2A where a new sona signal is acquired every $t_c=39.8$ seconds, leading to a dead time f duration $t_d=7$ seconds, the target is moving at a speed of 0.5 mm/s, and the carrier frequency is 5 GHz.

Since the test equipment does not allow broadcast of one sona while collecting another, it was not possible to transmit power during the collection time, leading to a finite "dead time", denoted $t_d$ in FIG. 5. During the broadcast period, the time-reversed sona 38 was continually broadcast into the cavity (once every 15 µs) and the peak-to-peak voltage across the receiver antenna 20 was measured once every 2.05 seconds, meaning that the reconstructions are highly under-sampled in this plot.

After every 15 samples were collected, the process was paused to collect a new sona and subsequently the process was repeated.

The full process of collecting a new sona and then broadcasting it for a given period time is referred as a full "cycle" of length $t_c$. The results in FIG. 5 were obtained using a carrier frequency of 5 GHz, $t_d$ of 7 seconds, and $t_c$ of 39.8 seconds.

Based on the experimental results, the peak-to-peak reconstruction voltage measured by the receiving antenna is expected to decay according to the sinc(x) function as the receiving antenna moves away from the reconstruction focal point. This sinc(x) function will be centered on the position where the sona was last collected, making the reconstruction focus to continually lag behind the receiving antenna 20.

Consequently, the maximum reconstruction strength is limited by the time needed to collect, time reverse and re-broadcast an updated sona.

The following equation is computed in the sub-system 46 (shown in FIG. 1) as a model for the peak-to-peak voltage of the reconstruction on a moving target as a function of time, assuming a constant velocity $\bar{v}$:

$$V(t) = \begin{cases} 0: & t(\text{mod} t_c) \leq t_d \\ a \cdot sinc\left(\frac{\bar{v}t}{b}\right) + d: & t(\text{mod} t_c) > t_d \end{cases} \quad \text{Eq. (2)}$$

Bandwidth and Target Velocity

In the experiments presented in previous paragraphs, it was found that the spatial distribution of the reconstruction sinc(x) function is dependent on the wavelength of the initial pulse. The varying reconstruction amplitudes at different wavelengths are due to variations in the antenna coupling efficiency with frequency.

The results show that the time reversal process is broadband, making it very attractive for multi-band or spread-spectrum WPT applications. Any WPT system utilizing time reversal will have to account for the finite-size "bubble" of fields around the main reconstruction point. In order to improve the spatial focusing of reconstructions well below the diffraction limit, a technique described in G. Lerosey, et al., "Focusing Beyond the Diffraction Limit with Far-Field Time Reversal," *Science*, vol. 315, no. 5815, pp. 1120-1122, 2007, may be used.

Based on the results shown in FIG. 5, the reconstruction amplitude varies over a wider range as the velocity of the target increases. Nevertheless, it is believed that one of the main advantages of time reversal over existing WPT methods is its ability to track moving targets.

The single-channel time reversal method (presented in previous paragraphs) is limited in the amount of power it can transmit to a target. It is believed that a multi-channel realization of time reversal will be able to deliver much greater time-integrated power.

The time reversed electromagnetic wave propagation is a new approach for wireless power transfer. The experiments demonstrated that the spatial profile of a reconstruction voltage is very tightly confined to the area surrounding the intended receiving antenna, and follows a sinc(x) profile. The ability to focus time-reversed signals onto a moving target in a ray-chaotic scattering environment has been successfully demonstrated.

Referring to FIGS. 6A-6D, another embodiment 52 of the present system and method is presented which constitutes a selective collapse of non-linear time reversed (NLTR) electromagnetic waves on a target of interest. In NLTR, both a linear sona 54 purely from the broadcast location (transmitting antenna) 16, i.e., port A, and a nonlinear sona 56a, 56b from the object 50a, 50b are collected (thus forming an overall sona 58) on the receiving antenna 20, i.e., port B, of interest.

NLTR works without any knowledge as to the exact location of the nonlinear object 50a, 50b, since the nonlinear sona 56a, 56b is uniquely created based on the object's location in the environment 12.

By filtering out either the linear or nonlinear frequencies from the overall recorded sona 58, it has been shown that selective targeting of either the linear port (i.e., the initial emitter of the interrogation pulse, i.e., port A) or the nonlinear port (the nonlinear object) 50a, 50b, may be realized (Frazier, et al., "Nonlinear Time Reversal in a Wave Chaotic System", Physical Review Letters 110, no. 6, (February 2013); 063902, doi: 10.1103/PhysRevLett, 110.063902).

Figure 6A:
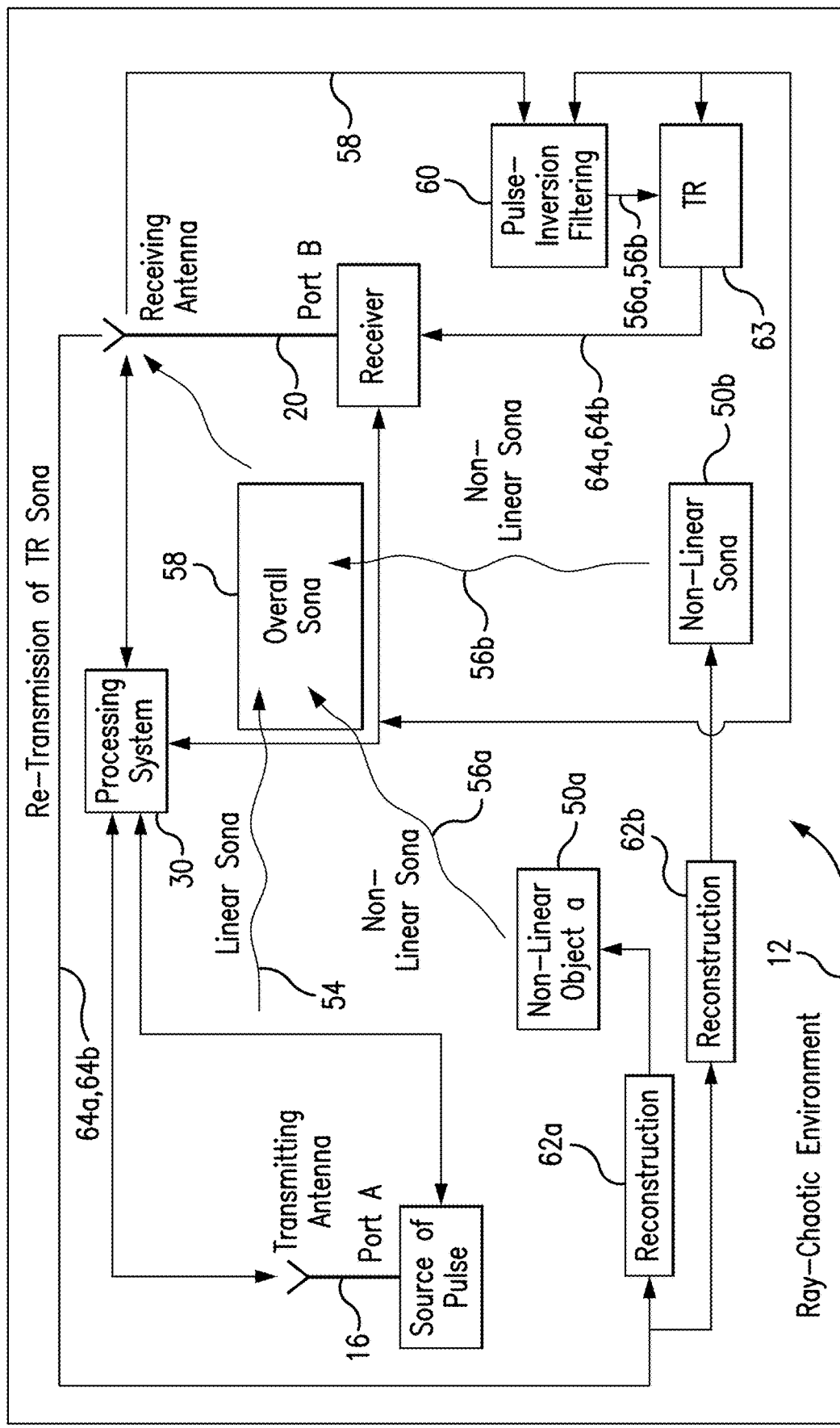
FIG. 6A is a schematic representation of another embodiment of the subject system adapted for power delivery to a target of interest.

In the present system 52 shown in FIG. 6A, the pulse-inversion filtering is performed by the Pulse-Inversion Subsystem 60 under control of the processing system 30 to efficiently isolate the nonlinear signal. This method extracts the nonlinear sona 56a, 56b by summing the sonas from interrogation and inverted interrogation pulses sent into the environment 12.

Due to the nonlinear nature of the response, the linear portion and odd-harmonics (1f, 3f, 5f, etc.), where f is the carrier frequency of the initial pulse 18, are cancelled and the even-harmonic nonlinear portion (2f, 4f, 6f, etc.) are doubled in amplitude. The nonlinear sona 56a, 56b is dominated by the 2f response.

For applications in wireless transmission of power, it is useful to broadcast power to multiple receiving devices 50a, 50b, . . . , etc. simultaneously. It has been shown numerically that this process may be performed thus, providing the framework for a practical WPT system.

Another useful aspect to the subject system 52 is to selectively differentiate between different nonlinear objects 50a vs. 50b, thus allowing the WPT system 52 to select which of the users will receive power to the exclusion of others. For example, two cell phones can be in a room and both are in the need of a charge. The present system 52 allows charging of one phone to the exclusion of the other.

Figure 6B:
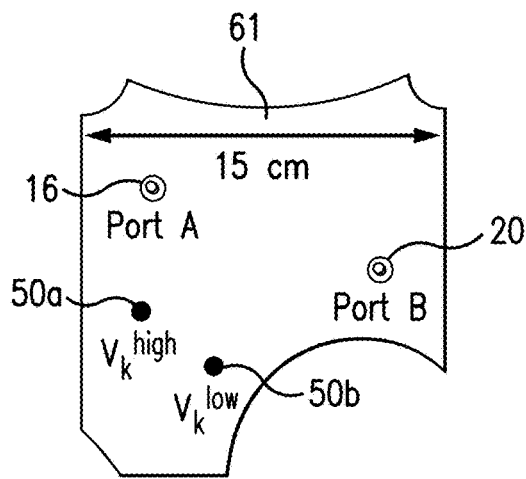
FIGS. 6B-6D are representative of a ray-chaotic setting for a single-channel NLTR, where

To establish a ray-chaotic setting for single-channel NLTR, a quasi-two-dimensional (2D) irregular cavity 61 has been created, shown in FIG. 6B. This cavity was built as a 15 cm×15 cm×0.76 cm square box modified with various circular and elliptical segments removed from the walls, as shown in FIG. 6B. Two Teflon-coated dipole antennas (Port A, Port B) were used to emit and record signals (Hemmady, Sameer, et al., "Universal Properties of 2-Port Scattering, Impedance and Admittance Matrices of Wave Chaotic Systems," Physical Review E 74, no. 3, (2006); 036213, doi; 10.1103/PhysRevE.74.03621).

Figure 6C:
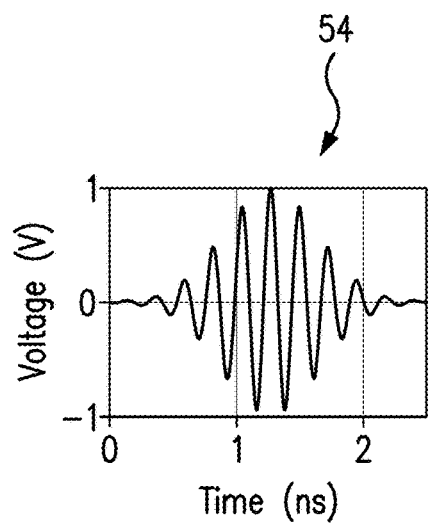
Figure 6D:
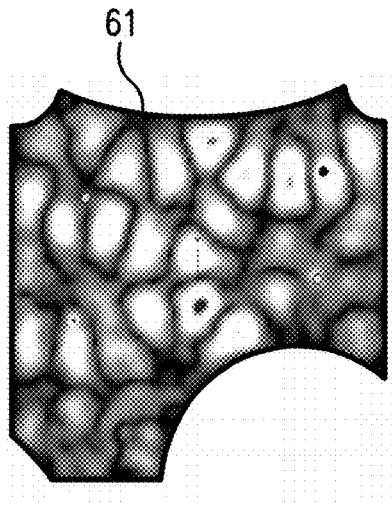

Two diodes (non-linear objects) 50a, 50b were placed inside the cavity 61. A 4.4 GHz center frequency pulse with a 1.0 GHz bandwidth was chosen to minimize the reflected power and applied to the transmitting antenna 16 (Port A). This bandwidth was chosen due to the limited mode density present in the particular geometry in the experiment, as TR requires many modes to be excited in the enclosure. In a larger cavity, such as a room in a building, the mode density would be much larger, allowing a smaller bandwidth to be used to excite the equivalent number of modes. The interrogation (initial pulse) 18 used in the simulation is shown in FIG. 6C.

Given the frequency range and dimensions of the box, there are relatively few modes excited by the incident pulse (FIG. 6D), compared to the number of modes excited in a three-dimensional room.

In the simulation, a model diode was used to represent a passive nonlinear object. The nonlinear I-V curve causes the diode to have a significant harmonic current responsive when excited above a specific voltage knee, $V_k$. The diode I-V characteristic is defined as:

$$I = I_u \left( e^{\frac{v}{v_k} \alpha} - 1 \right) \qquad \text{Eq. (3)}$$

Using $\alpha=1.3$, $V_k$ was defined as the voltage needed to produce a current $I=0.2\ I_0$, as this represented the approximate start of the nonlinear behavior.

Figure 7:
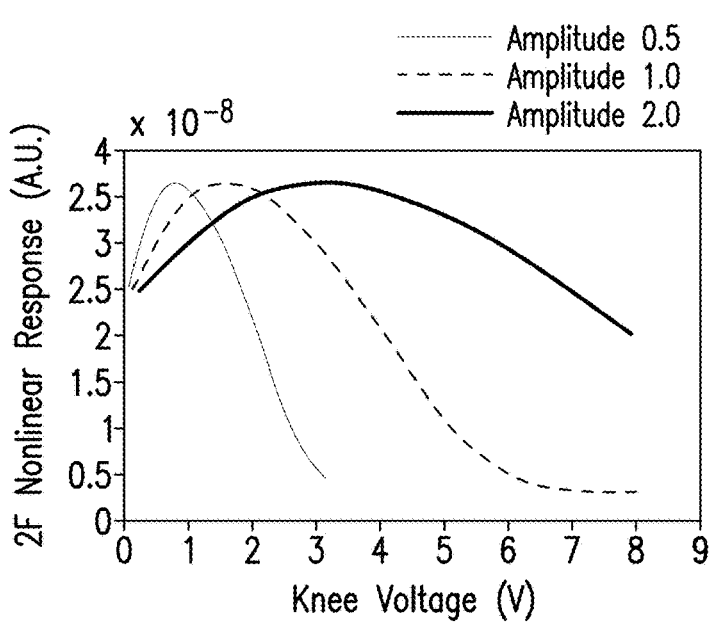
FIG. 7 is a diagram representative of the non-linear response of the model diode over different $V_k$ values and different pulse amplitudes at a fixed 4.4 GHz center frequency with a 1.0 GHz bandwidth where a single value of $V_k$ is found for each scenario that maximizes the non-linear response.

FIG. 7 shows the amplitude of response at the second harmonic frequency as a function of the diode knee voltage $V_k$ for several different driving signal amplitudes at the fundamental frequency.

The response was obtained by sweeping over numerous $V_k$ values for different initial pulse amplitudes given the same geometry and process conditions (as presented in previous paragraphs), where the pulse was emitted at the Port A, the signal was recorded at the Port B, and the diode location was at the $V_k^{low}$ diode position shown in FIG. 6B.

FIG. 7 shows that given a $V_k$, a pulse amplitude can be chosen to maximize the nonlinear response. FIG. 7 also shows that for diodes with sufficiently large $V_k$, a small nonlinear response is observed, since the diode is not stimulated with voltages approaching $V_k$ to produce a harmonic signal. Given this distribution, different amplitude interrogation pulses may be selected to target either a high-$V_k$ or low-$V_k$ diode.

In the simplest scenario, the same $V_k$ may be chosen for both diodes 50a, 50b causing both diodes to produce roughly the same strength harmonic response. After performing the full NLTR process, this results in robust reconstructions 62a, 62b at both diodes 50a, 50b, respectively, as shown in FIG. 8.

This result establishes an important milestone in the use of NLTR as a WPT technology, as NLTR can transfer power to multiple locations of interest simultaneously.

Figure 8:
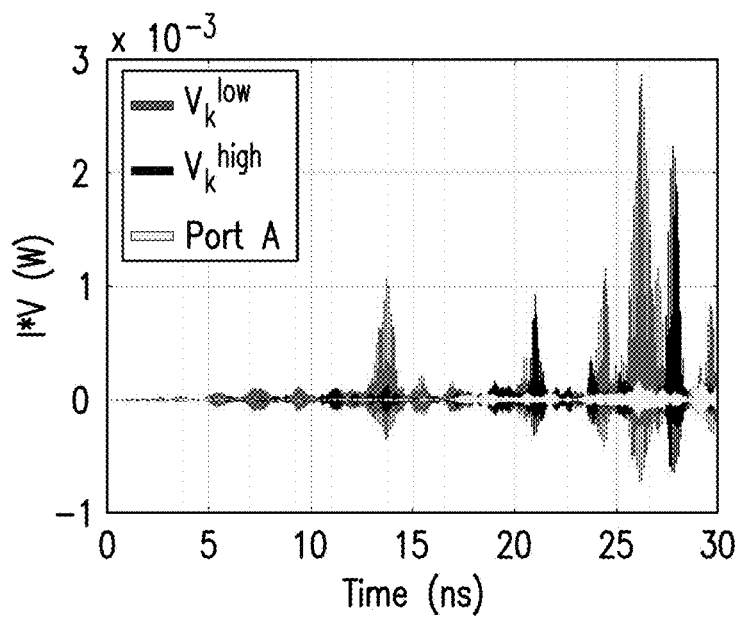
FIG. 8 is a diagram representative of the instantaneous power monitor on the two diodes $V_k^{low}$ and $V_k^{high}$ as a function of time near the reconstruction time (similar constructions occur on both diodes using NLTR when $V_k$ is the same for both diodes. The non-target location near port A receives the small amount of power relative to the two diodes)

To determine the signal-to-noise ratio of the reconstruction 62a, 62b, the power in a diode in close proximity to Port A was measured, shown in FIG. 8, representing the power delivered at a noise of 7.84:1 and 10.1:1 for the $V_k^{low}$ and $V_k^{high}$ diodes, respectively.

The present system and method also allows for selective powering of one target (for example, target 50a) to the exclusion of another (for example, target 50b).

The exclusive targeting can take place in a system with multiple diodes 50a, 50b, . . . , etc. present. Two diodes are considered (as shown in FIGS. 6A, 6B) as an example only, but not to restrict the scope of the present invention to this particular implementation.

One diode 50a has $V_k$=0.79 V (denoted $V_k^{low}$), and another diode 50b has $V_k$=6.60 V (denoted $V_k^{high}$). Given the large value of $V_k^{high}$, it is expected to see no response in the diode 50b while maintaining a reasonable nonlinear response in the $V_k^{low}$ diode 50a. A pulse with amplitude V=1.0 V was used during the time forward emission of the initial pulse 18 at the Port A shown in FIGS. 6A and 6B. Using pulse-inversion filtering technique (supported by the pulse-inversion filter sub-system 60), the nonlinear sona 56a was extracted from the recorded signal at Port B. The signal 56a was subsequently time-reversed in the TR sub-system 63 to form TR non-linear signal (64a, 64b) and subsequently re-emitted into the environment 12 from the Port B.

Figure 9A:
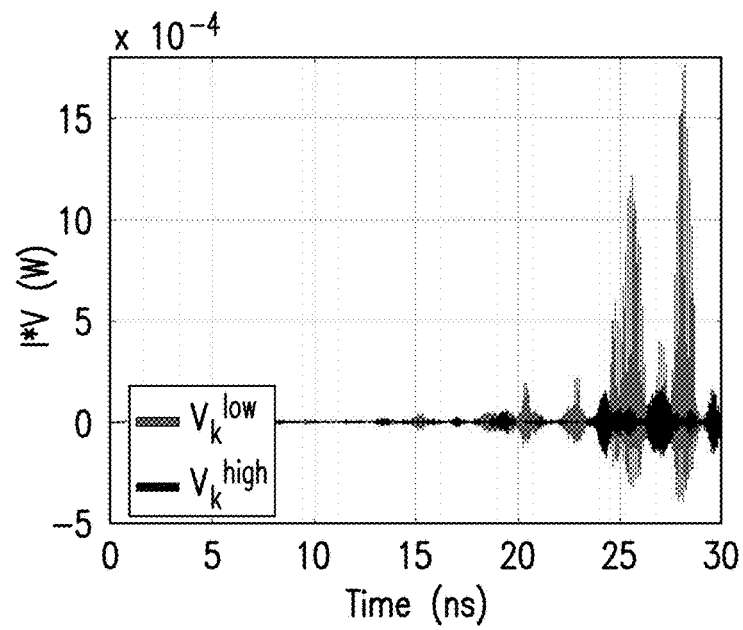
FIG. 9A is a diagram representative of time-reverse reconstructions of the two diodes while targeting $V_k^{low}$ (very little signal is seen on the $V_k^{high}$ diode).
Figure 9B:
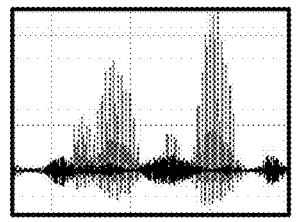
FIG. 9B shows the details of the reconstructions of FIG. 9A between 23 and 30 ns.

FIGS. 9A-9B show the time-reversed reconstructions 62a, 62b on both diodes 50a, 50b, respectively.

The process results in a reconstruction 62a almost exclusively on the $V_k^{low}$ diode 50a during the time-reversed step.

To calculate the quality of the selective reconstruction, the aspect ratio was computed by comparing the maximum instantaneous power on both diodes 50a, 50b. For this scenario, a power delivery aspect ratio of 10.1:1 was calculated for the V diode 50a relative to the diode 50b with $V_k^{high}$. This aspect ratio indicates that the $V_k^{high}$ diode 50b receives as much power as a non-target location, as shown in the simultaneous reconstruction experiment, where 7.81:1 and 10.1:1 signal-to-noise ratios were calculated for non-target locations (presented in previous paragraphs).

The numerical results of the conducted experiments have illustrated a method to perform simultaneous and selective nonlinear time-reversal in the presence of multiple nonlinear objects in a cavity. In the simultaneous reconstruction simulation, the signal-to-noise ratio of the NLTR process was calculated to be 7.84:1 and 10.1:1 for the two diodes in question. A delivered power aspect ratio of 10.1:1 was also observed for target power versus non-target power for selective targeting using NLTR.

Further improvements may be expected in this aspect ratio by increasing the enclosure mode density, sona collection time, number of channels in the NLTR mirror, and/or fine tuning the nonlinear object model. This ability to selectively target nonlinear objects in an enclosure can be used for wireless power applications by rectifying the reconstruction signals 62a, 62b, as well as allowing nonlinear time-reversal to transfer power to a DC load without knowledge of its location.

The subject system further exploits the harmonic generation and rectification capabilities of the Schottky diode to create a dual-purpose rectenna (rectifier/antenna) for wireless power transfer by the method of nonlinear time reversal. A high frequency, low impedance MA4E1317 Schottky diode was chosen in the subject system as the rectifier and a nonlinear element.

The diode is mounted on a half-wave dipole printed circuit board designed for operation at 5.45 GHz. In addition, a capacitor is mounted between the diode and the load, filtering out high frequency signals. The diode and capacitor permit rectification of received microwave power to DC power which is subsequently sent to the load.

In addition, by excluding low-pass filtering between the dipole and the diode, harmonics generated by the diode are able to escape, allowing the rectenna to act as a passive nonlinear element as well. This harmonic signal is wasted in conventional rectenna designs. In the subject system, the harmonic signal is utilized to create a passive nonlinear beacon that broadcasts the location of the device to a time-reversal base station. Experimental testing of a prototype rectenna produced positive results for both antenna functions.

The rectenna was designed for the subject system 10, 52 to satisfy the following parameters:

(a) the rectenna must operate efficiently at the high frequency (1-10 GHz) required for efficient NLTR;

(b) losses due to reflection and parasitic effects within the antenna should be minimized; and (c) to fulfill the role of a nonlinear element, the rectenna should generate distinguishable harmonics strong enough for the purposes of NLTR.

In short, to rectify and generate harmonics for NLTR, the rectenna must be capable of not only efficient rectification at high frequencies, but also production of harmonics for NLTR.

Diode Selection and Testing

The diode is the most important single component in the rectenna, as it serves as the main rectifying component. Careful consideration of its characteristics is vital, i.e., the upper switching frequency, forward voltage drop, and impedance of the diode are of particular importance to the desired goal of efficient rectification.

For the rectenna in the present design to perform efficiently, the diode must satisfy several requirements:

(1) the diode must maintain rectification functionally at a transmission frequency of 1-10 GHz. This requirement severely limits the possible choices for the rectenna diode. The frequency of a diode is inversely related to its reverse-recovery time ($t_{rr}$) which is the fastest time the diode can switch from forward to reverse bias.

In traditional P-N junction diodes, minimum $t_{rr}$ is on the order of tens to thousands of nanoseconds, even for fast diodes. In a high frequency circuit, a P-N diode would be no different than a short circuit, and no rectification would occur.

(2) The diode must have the lowest forward voltage drop possible. The voltage drop represents the reverse bias that remains when the diode operates in the forward direction, and can be a significant contributor to power loss. The experimental WPT capabilities are limited to fairly low voltage microwave signals (0.5 V to 1 V signal amplitude, which makes forward voltage drop especially important).

(3) Finally, parasitic impedances should be minimized. All diodes have parasitic impedances such as parasitic capacitance and resistance. Impedances contribute to losses during rectification, and minimizing these losses would increase the efficiency of rectification.

Considering these factors, a Schottky barrier diode has been chosen for the rectenna. Unlike P-N junction diodes, Schottky diodes have extremely low $t_{rr}$ and low forward. Schottky diodes have a lower maximum reverse voltage rating, higher reverse leakage current, and higher cost than P-N diodes. However, these are relatively minor issues in the subject system. A MA4E1317 Schottky diode was chosen as the rectifying diode. The diode parameters from the manufacturer's datasheet are shown in Table 1.

TABLE 1

| Test Conditions | Symbol | Units | Min. | Typ. | Max. |
|---|---|---|---|---|---|
| Junction Capacitance at 0 V at 1 MHz | Cj | pF | — | .020 | — |
| Total Capacitance at 0 V at 1 MHz | Ct | pF | .030 | .045 | .060 |
| Junction Capacitance Difference | DCj | pF | — | — | — |
| Series Resistance at +10 mA | Rs | Ω | — | 4 | 7 |
| Forward Voltage at +1 mA | $Vf_1$ | V | .60 | .70 | .80 |
| Forward Voltage Difference at +1 mA | DVf | V | — | — | — |
| Reverse Breakdown Voltage at −10 µA | Vbr | V | 4.5 | 7 | — |
| SSB Noise Figure | NF | dB | — | 6.5[4] | — |

The MA4E1317 Schottky diode has low total capacitance (0.045 pF) and series resistance (4Ω), minimizing parasitic losses. The datasheet also cites an operating frequency of up to 80 GHz for this diode, more than sufficient for the purposes of the subject system and method. The forward voltage is about 0.7 V, which is a typical value for most diodes.

Antenna Design

Figure 10:
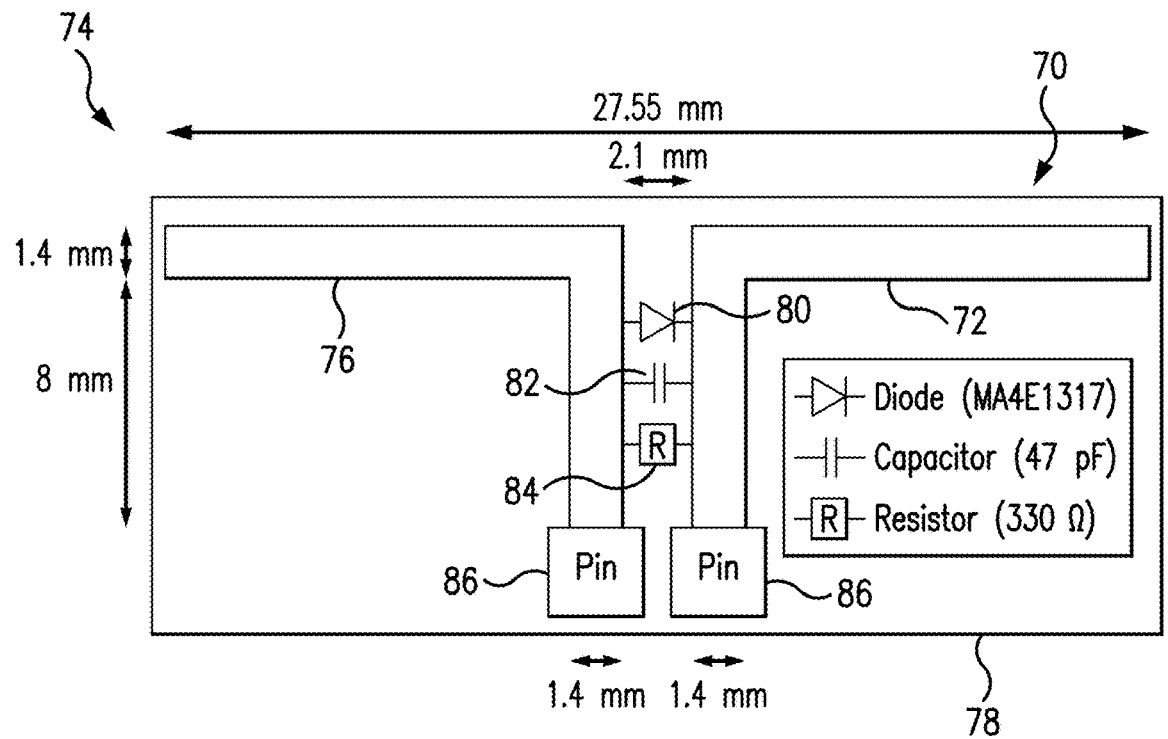
FIG. 10 shows a schematic representation of yet another alternative embodiment of the subject system with the PCB rectenna.
Figure 11A:
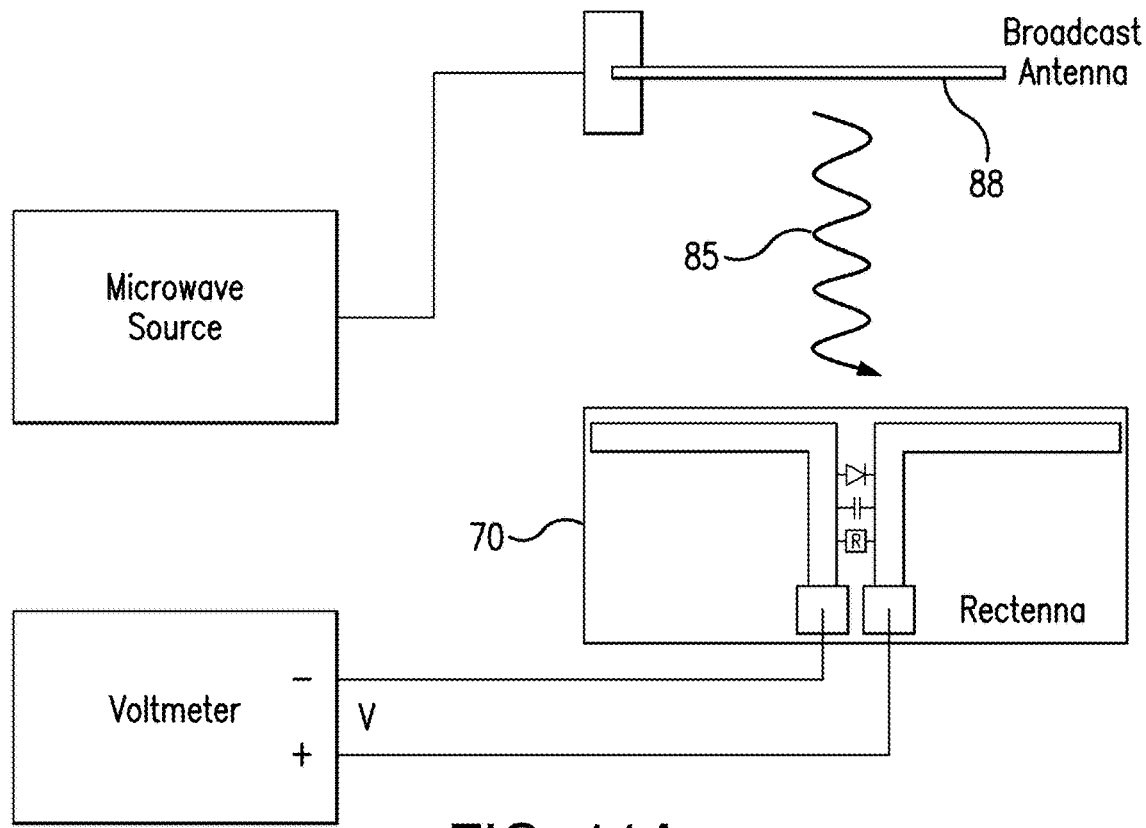
FIG. 11A is a schematic representation of the experimental set-up for a rectification testing.
Figure 13A:
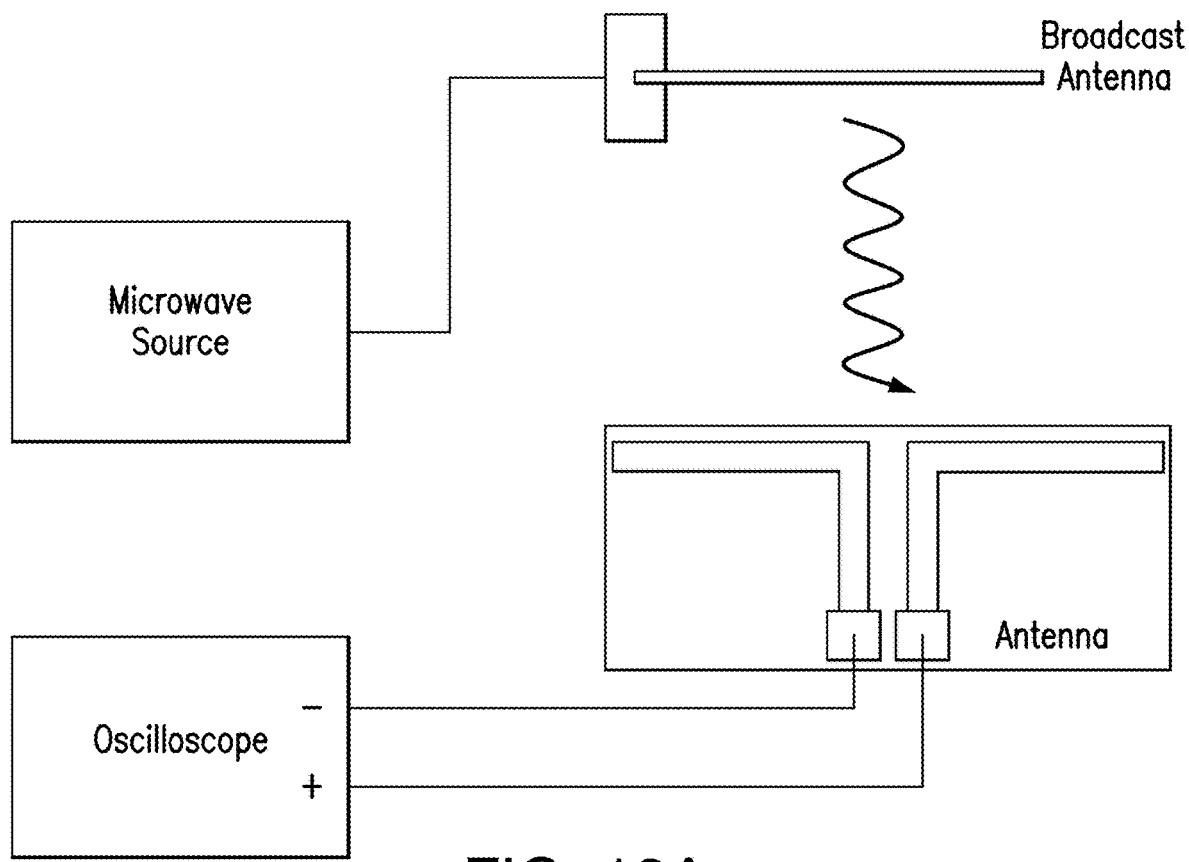
FIG. 13A is a schematic representation of the experimental set-up for measuring accepted AC power.

Referring to FIG. 10, a printed circuit board (PCB) half-wave dipole rectenna 70 was chosen as the receiving antenna 72 for the subject system 74 (schematically shown in FIGS. 11A and 13A). The copper trace 76 patterned on the FR-4 substrate 78 acts as the receiving antenna 72. The rectenna 70 can be used in the subject system 10, 52 (shown in FIGS. 1 and 6A) instead of the receiving antenna 20.

The MA4E1317 Schottky diode 80 is a flip-chip device, and is suitable for mounting on a PCB. The design and specific parameters of the antenna is based on the dual frequency WPT rectenna, but has been modified for the subject implementation.

The rectenna 70 is composed of three surface-mount components: (1) the MA4E1317 Schottky diode 80 acts as the rectification and harmonic generation components;

(2) a 47 pF high-frequency ceramic capacitor 82 acts as a low-pass filter, blocking microwave signals from reaching the load; and (3) a 330Ω resistor 84 is used as a load for experimental purposes.

Output pins 86 are also attached for measurement purposes. The antenna is designed for operation at 5.45 GHz, so the length of the dipole is 27.55 mm, half the free-space wavelength of the incident wave.

The topology of the Schottky diode 80 was chosen to maximize rectification efficiency. The Schottky diode 80 is positioned as a shunt to the feed-in lines 76 of the rectenna 70. This topology was chosen instead of a voltage doubler (a two diode configuration) because of its inherently higher power efficiency. However, if higher voltage levels are necessary for a load device, the voltage doubler would be a better choice.

One important distinction for the subject rectenna 70 is the lack of band-pass filtering for higher-order harmonics. This feature is common in most rectennas, but is deliberately left out to allow the harmonic response of the Schottky diode to escape through the dipole 70.

It is worth noting the lack of impedance matching between the antenna 72 and the rectifier components 80, 82, 84. This is an important point to consider, as the proper matching of the components should significantly improve the efficiency of rectification.

Rectenna Testing

To thoroughly test the rectenna, distinct tests were run in order to verify both its rectification and harmonic generation capabilities. A range of frequencies were examined for all tests to isolate peak performance.

Rectification of AC to DC Power

To determine the overall rectification efficiency, a second antenna was used to broadcast energy to the rectenna 70. A 17 dBm continuous wave signal 85 was generated from a microwave source and broadcast through a monopole antenna 88. As shown in FIG. 11A, the rectenna 70 was positioned parallel to the broadcast antenna 88, at a distance of 2 cm, and the average DC voltage and power was measured over the load resistor 84. The test was repeated over a range of broadcast frequencies from 1-7 GHz.

Figure 11B:
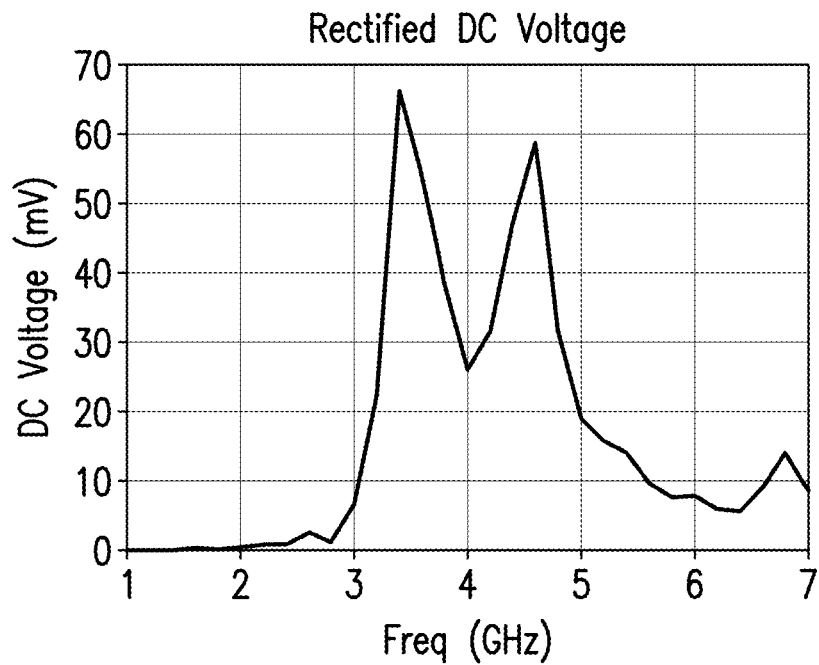
FIG. 11B is a diagram representative of the average DC voltage measured from the volt meter in 10A for a range 1-7 GHz of frequency inputs.

The results of the experiments for the setup (FIG. 11A) are shown in FIG. 11B. Rectification was most pronounced in the 3-5 GHz frequency band. Rectified voltage is highest at 3.4 GHz and 4.6 GHz, with DC voltage levels of 66.5 mV and 59.0 mV respectively.

Given the resistive load 84 of 330Ω, the rectified DC power can be calculated from the indicated voltage. Using DC voltage (V) and load resistance (R), the average DC power ($P_{dc}$) was calculated as:

$$P_{dc} = \frac{V^2}{R} \qquad \text{Eq. (4)}$$

Figure 12:
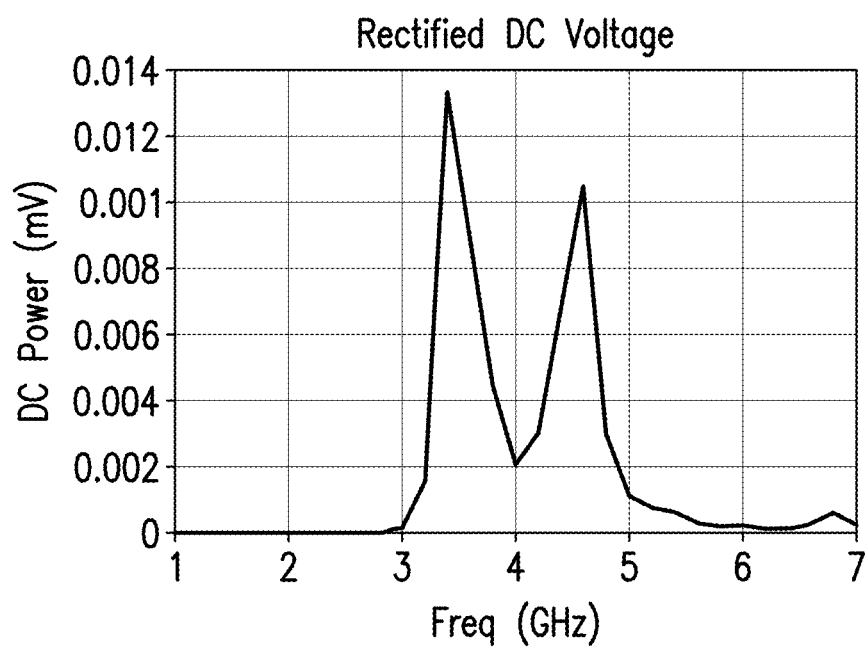
FIG. 12 is a diagram representative of the average rectified DC power calculated from DC voltage using the relation: $P_{dc}=V2/R$.

A plot of the resulting average DC power delivered to the load 84 as a function of frequency is shown in FIG. 12.

Considering the input power of 17 dBm (around 50.12 mW), the wall-to-load efficiency of the experiment is extremely low for all frequencies. These losses can accrue from a number of sources, including insufficient coupling between the broadcast antenna and rectenna, reflection from broadcast antenna, losses in coaxial connections between components, and power radiated away from the rectenna, among others. However, the inherent losses of the experimental setup are not relevant to the overall efficiency of the system. For this, the DC rectification result must be compared to a level of power accepted by the antenna.

To establish rectification efficiency, AC power tests were conducted on a bare dipole antenna with no diode, resistor, or capacitor. The results of this test established the overall power accepted by the rectenna, representing the peak power available for rectification. These results were directly comparable to the previous DC power results.

The setup of the AC power experiment (shown in FIG. 13A) was similar to the DC power experiment (shown in FIG. 11A), with the exception of two key differences: (a) the voltmeter was replaced by a DS091304A oscilloscope, and (b) the rectenna was replaced by the bare dipole antenna. In the absence of the 330Ω load resistor on the rectenna, the 50Ω input impedance of the oscilloscope (Keysight Technologies, Infiniium 90000 Series Oscilloscopes, Rev. V8) was used as the load.

Using AC voltage amplitude ($V_{max}$) and load resistance (R), the accepted AC power ($P_{ac}$) was calculated as:

$$P_{ac} = \frac{V_{max}^2}{2R} \qquad \text{Eq. (5)}$$

Figure 13B:
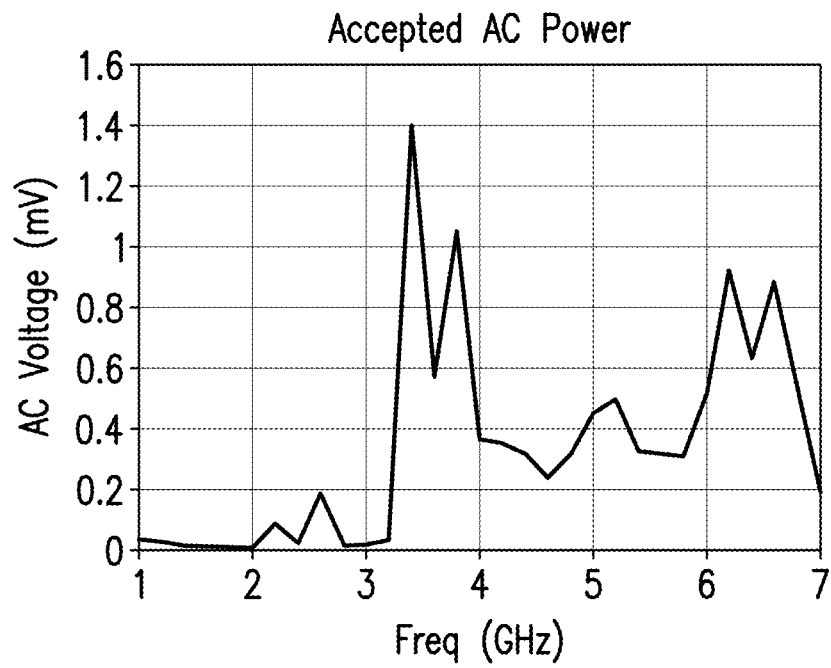
FIG. 13B is a diagram representative of the accepted AC power calculated using the relation $P_{ac}=V_{max}^2/2R$ used to establish a baseline for efficiency calculations.

The test results for the experimental setup shown in FIG. 13A are presented in FIG. 13B. Assuming that the transfer function between the antennas doesn't change between the AC and DC tests, these results allow the rectification efficiency to be calculated. The efficiency (E) in this case is the ratio of the rectified DC power ($P_{dc}$) to the total accepted AC power ($P_{ac}$), as:

$$E = \frac{P_{dc}}{P_{ac}} \qquad \text{Eq. (6)}$$

Figure 14:
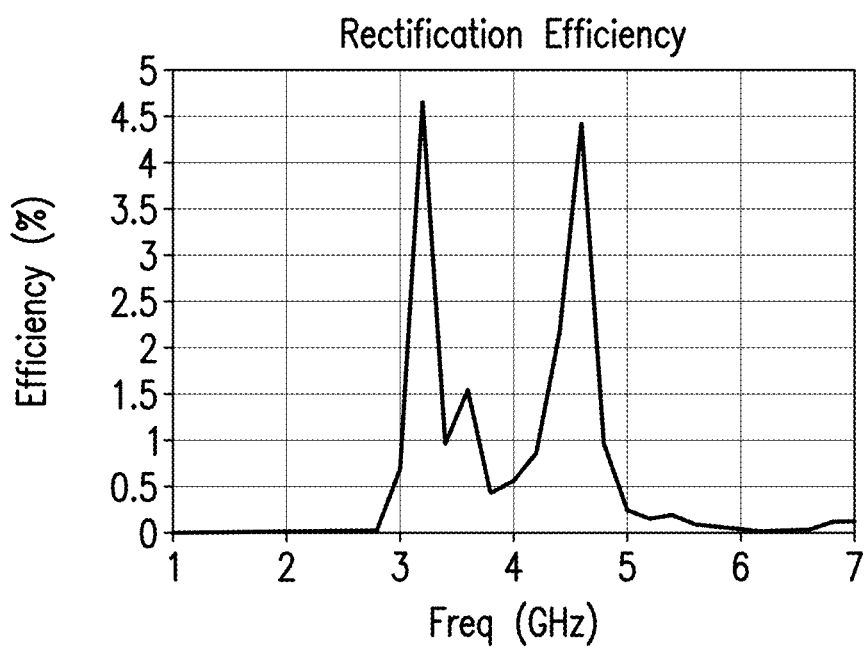
FIG. 14 is a diagram representative of the rectification efficiency calculated using the accepted power as a baseline, using the ratio of the rectified DC power to the accepted AC power.

FIG. 14 shows the efficiency calculated using (Eq. 6) across the range of frequencies tested. Analysis of the graph presented in FIG. 14 shows the same peak rectification efficiencies at 3.2 GHz and 4.6 GHz, with 4.7% and 4.4% respectively. This rather low efficiency is expected given the lack of optimization and impedance matching in the rectenna. However, this result clearly demonstrates rectification of microwave power to DC power.

Harmonic Generation

Figure 15:
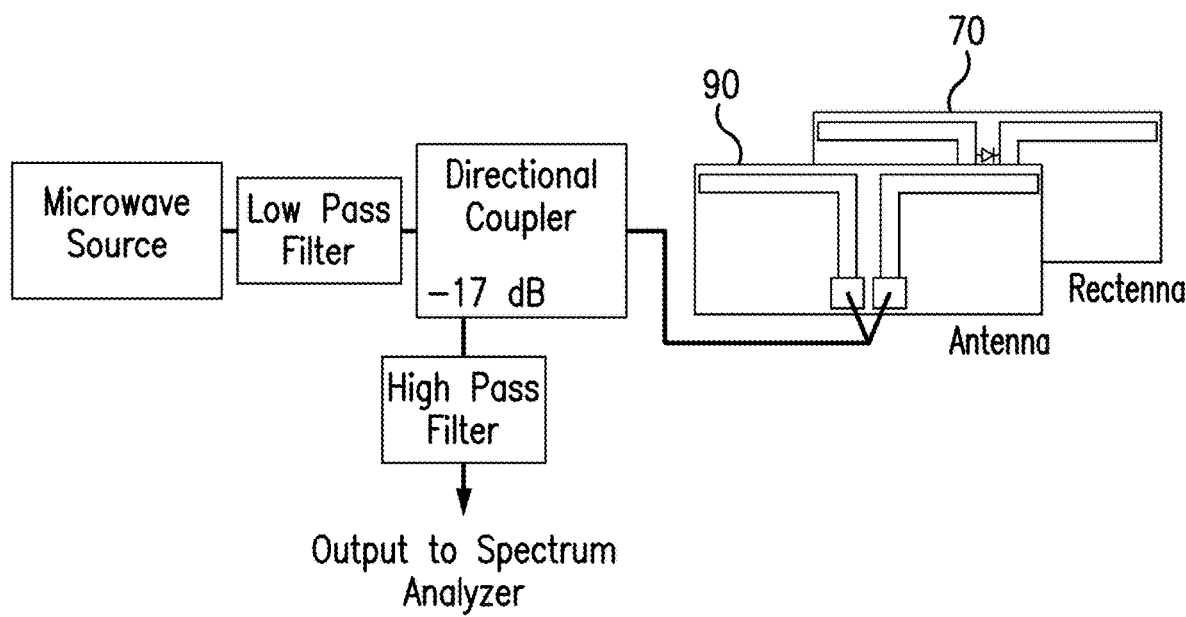
FIG. 15 is a schematic representation of the experimental setup for harmonic generation testing.

Referring to FIG. 15, harmonic generation was tested by measuring second harmonic power reflected from the rectenna 70. A microwave source produced a 10 dBm continuous wave signal, which was broadcast from a bare antenna 90 of the same length as the rectenna. The rectenna 70, positioned around 1 mm away in the same orientation as the broadcast antenna 90, should passively generate second harmonics from this fundamental signal. These second harmonic reflections were collected by the bare antenna, passing through a directional coupler and into a spectrum analyzer for measurement.

As seen in the experimental setup in FIG. 15, harmonic output from the microwave source was filtered out by a low pass filter. The harmonic response from the rectenna 70 was isolated from the fundamental tone by means of a high pass filter, before the signal entered the spectrum analyzer. With a 2.45 GHz fundamental frequency input, a distinct 2nd harmonic was found with −150 dBm output power, distinctly higher than to the noise level power of −161 dBm. Bandwidth restrictions of filtering components prevented analysis of a full frequency spectrum, and thus, 2.45 GHz was the only frequency probed for harmonics. Even so, this result does demonstrate the harmonic generation capabilities of the rectenna.

Future rectenna design may benefit from physically splitting the base signal from its harmonic so that the two signals may have dedicated circuitry for each goal. The base signal would be optimized for harmonic generation while the 2f harmonic input would be optimized for rectification. One such method may use a multiplexer to split incident signal into a if and 2f signal. This system would not suffer parasitic losses due to frequency mismatch between the if and 2f circuitry.

The subject design of the dual-purpose rectenna (shown in FIG. 10) has proven to be functional in the subject NLTR based WPT system (shown in FIGS. 1 and 6A). It is able to receive the initial interrogation pulse and generate a 2nd harmonic response. It is also able to receive the high power pulse and rectify the signal, providing the load device with DC power. Due to the nature of NLTR, the receiving devices do not require power to facilitate either process. After considerable optimization and miniaturization, the subject rectenna would be used as a general-purpose receiver for the electronics to be powered.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for wireless power transfer to a target of interest using time-reversed electromagnetic wave propagation, comprising:
   (a) establishing a three-dimensional reverberant complex scattering environment;
   (b) positioning a transmitting antenna and a receiving antenna in said reverberant complex scattering environment;
   (c) positioning at least one passive non-linear object in said reverberant complex scattering environment;
   (d) broadcasting an initial signal of a predetermined amplitude at a first frequency from said transmitting antenna,
   wherein said initial signal causes a non-linear response signal generated by said at least one passive non-linear object at a second frequency depending on a predetermined voltage $V_k$, said at least one passive non-linear object generating said non-linear response signal when excited above said predetermined voltage $V_k$,
   (e) recording a resulting signal at said receiving antenna, said resulting signal being composed of a signal corresponding to said initial signal sent from said transmitting antenna and said non-linear response signal from said at least one passive non-linear object;
   (f) extracting said non-linear response signal from said resulting signal using pulse-inversion filtering;
   (g) time-reversing said extracted non-linear response signal, thus forming a time-reversed extracted non-linear response signal; and,
   (h) re-emitting said time-reversed extracted non-linear response signal from said receiving antenna into said reverberating complex scattering environment to create a reconstruction non-linear signal collapsing at said least one passive non-linear object, thus tracking said at least one non-linear object and delivering power thereto, wherein said reconstruction non-linear signal constitutes said delivered power.

2. The method of claim 1, further comprising:
   in said step (c), positioning at least two passive non-linear objects in said reverberant complex scattering environment, said at least two non-linear passive objects having different voltages $V_k$, said voltage $V_k$ determining the strength of the non-linear response.

3. The method of claim 1, further comprising:
   in said step (c), varying said voltage $V_k$ to control said non-linear response.

4. The method of claim 2, further comprising:
   in said step (d), broadcasting said initial signal from said transmitting antenna at different amplitudes to control the strength of the non-linear response and to track a corresponding one of said at least two non-linear passive objects.

5. The method of claim 1, wherein said at least one passive non-linear object includes portable electronic devices, diodes, accelerometers, tumors.

6. The method of claim 1, wherein said power transmission to said at least one passive non-linear object includes wireless electrical transmission, wireless heating, hyperthermic treatment of cancers.

7. The method of claim 1, further comprising:
in step (e), rectifying said recorded resulting signal at said receiving antenna.

8. The method of claim 7, further comprising:
generating, at said receiving antenna, non-linear harmonic adequate for the signal time-reversing in said step (g).

9. The method of claim 1, further comprising:
in said step (e), coupling a Schottky diode to said receiving antenna providing a dual-purpose antenna with rectification and non-linear harmonic generation.

10. A system for wireless power transfer to a target of interest using time-reversed electromagnetic wave propagation, comprising:
(a) a transmitting antenna and a receiving antenna positioned in a reverberant complex scattering environment, said transmitting antenna broadcasting an initial signal of a predetermined amplitude at a first frequency;
(b) at least one passive non-linear object positioned in said reverberant complex scattering environment, said at least one passive non-linear object generating a response non-linear signal when excited above a predetermined voltage $V_k$;
(c) a processing system coupled to said receiving antenna and said at least one passive non-linear object, said processing system being configured for recording a resulting signal at said receiving antenna, wherein said resulting signal is composed of a signal corresponding to said initial signal broadcast from said transmitting antenna and said non-linear response signal emitted from said at least one passive non-linear object,
(d) a pulse-inversion filter sub-system coupled to said processing system and configured for extracting said non-linear response signal from said resulting signal using pulse-inversion filtering; and
(e) a time-reversing sub-system coupled to said processing system and said pulse inversion filter sub-system and configured for time-reversing said extracted non-linear response signal;
wherein said processing system is further configured to control re-emitting of said time-reversed non-linear response signal from said receiving antenna into said reverberating complex scattering environment to create a reconstruction non-linear signal at said at least one passive non-linear object, said reconstruction non-linear signal corresponding to a power transmitted to said at least one passive non-linear object.

11. The system of claim 10, further comprising:
at least two non-linear passive objects positioned in said reverberant complex scattering environment, said at least two non-linear passive objects having different voltages $V_k$ determining the strength of the non-linear response.

12. The system of claim 10, wherein said processing system is further configured to vary said voltage $V_k$ to control said non-linear response.

13. The system of claim 11, wherein said processing system is further configured for broadcasting said initial signal from said transmitting antenna at different amplitudes to control the strength of the non-linear response and to target a corresponding one of said at least two non-linear passive objects.

14. The system of claim 10, wherein said at least one passive non-linear object includes portable electronic devices, diodes, accelerometers, tumors, and wherein said power transmission to said at least one passive non-linear object includes wireless electrical transmission, wireless heating, hyperthermic treatment of cancers.

15. The system of claim 10, further comprising:
a Schottky diode coupled to said receiving antenna to result in a dual-purpose antenna with rectification and non-linear harmonic generation.

* * * * *